(12) United States Patent
Kubo

(10) Patent No.: US 10,147,027 B2
(45) Date of Patent: Dec. 4, 2018

(54) IMAGE PROCESSING APPARATUS THAT PERFORMS DIFFERENT PROCESSES IN PARALLEL, METHOD, AND PROGRAM

(71) Applicant: Konica Minolta, Inc., Chiyoda-ku, Tokyo (JP)

(72) Inventor: Hiroaki Kubo, Muko (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/678,470

(22) Filed: Aug. 16, 2017

(65) Prior Publication Data
US 2018/0053075 A1    Feb. 22, 2018

(30) Foreign Application Priority Data
Aug. 18, 2016 (JP) .................. 2016-160465

(51) Int. Cl.
 G06K 15/02  (2006.01)
 H04N 1/00   (2006.01)

(52) U.S. Cl.
 CPC ....... G06K 15/1861 (2013.01); G06K 15/184 (2013.01); G06K 15/1817 (2013.01); G06K 15/1821 (2013.01); G06K 15/1857 (2013.01); H04N 1/00843 (2013.01); H04N 2201/0094 (2013.01)

(58) Field of Classification Search
None
See application file for complete search history.

(56) References Cited

U.S. PATENT DOCUMENTS

| 5,604,846 | A | * | 2/1997 | Kadota | G06K 15/00 358/1.15 |
| 5,654,804 | A | * | 8/1997 | Hattori | G06K 15/00 358/1.16 |
| 5,680,521 | A | * | 10/1997 | Pardo | G06K 15/00 358/1.13 |

(Continued)

FOREIGN PATENT DOCUMENTS

| JP | 07-256953 A   | 10/1995 |
| JP | 09-234911 A   | 9/1997  |
| JP | 2001-313820 A | 11/2001 |

*Primary Examiner* — Miya J Williams
(74) *Attorney, Agent, or Firm* — Buchanan Ingersoll & Rooney PC

(57) ABSTRACT

An image processing apparatus includes: a raster data output that executes a first process of outputting raster data; a data transferer that generates image determination-purpose data, and executes a second process of storing the generated image determination-purpose data in a buffer; and a hardware processor that: executes a third process of determining whether an image presented by the image determination-purpose data contains a specific image, generates schedule information indicating a time schedule of the first, second, and third processes, determines each set of raster data on whether the time schedule satisfies an overflow condition, and performs control to extend the buffer, wherein the overflow condition is a condition that a part of a period of the second process overlaps with a part of a period during which the image determination-purpose data for which the third process has not been completed occupies an entire area of the buffer.

12 Claims, 19 Drawing Sheets

(56) References Cited

U.S. PATENT DOCUMENTS

| | | | | |
|---|---|---|---|---|
| 5,832,126 A | * | 11/1998 | Tanaka | G06T 9/00 |
| | | | | 382/239 |
| 6,181,435 B1 | * | 1/2001 | Onodera | G06K 15/00 |
| | | | | 341/107 |
| 6,687,017 B1 | * | 2/2004 | Kakiuchi | H04N 1/00843 |
| | | | | 358/1.14 |
| 7,376,966 B2 | * | 5/2008 | Okigami | G06F 21/31 |
| | | | | 726/4 |
| 7,728,842 B2 | * | 6/2010 | Honmi | G06F 3/1204 |
| | | | | 345/530 |
| 7,995,233 B2 | * | 8/2011 | Liu | G06F 3/1204 |
| | | | | 358/1.16 |
| 9,477,912 B2 | * | 10/2016 | Suzuki | G06K 15/1817 |
| 2005/0185207 A1 | * | 8/2005 | Mitani | G06F 3/1213 |
| | | | | 358/1.13 |
| 2009/0190147 A1 | * | 7/2009 | Uruta | H04N 1/2307 |
| | | | | 358/1.9 |

* cited by examiner

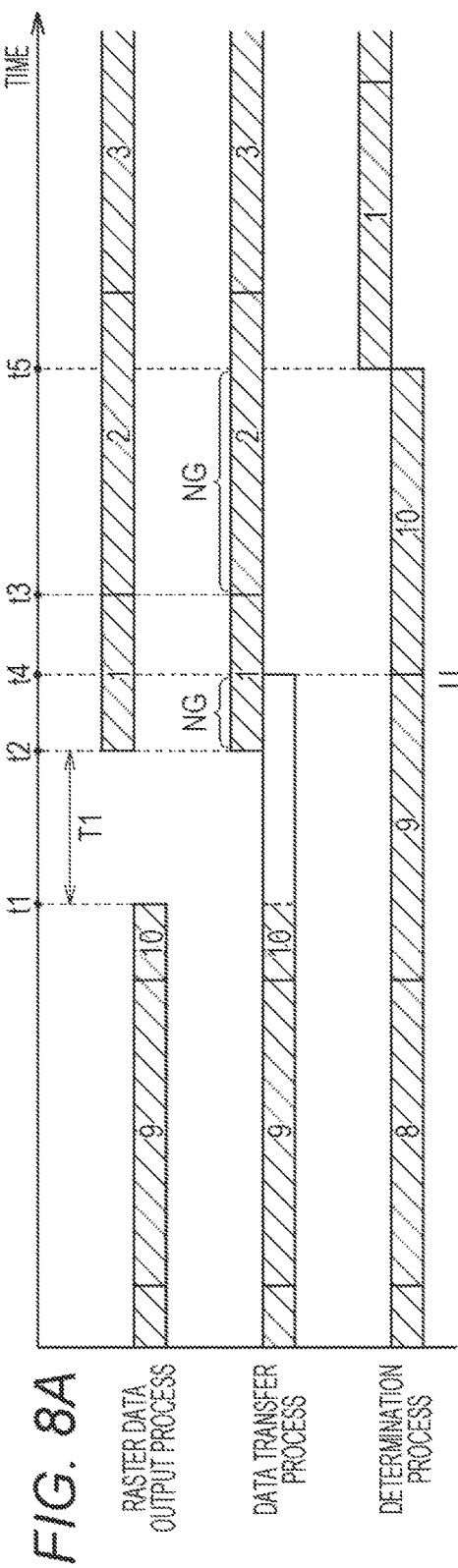
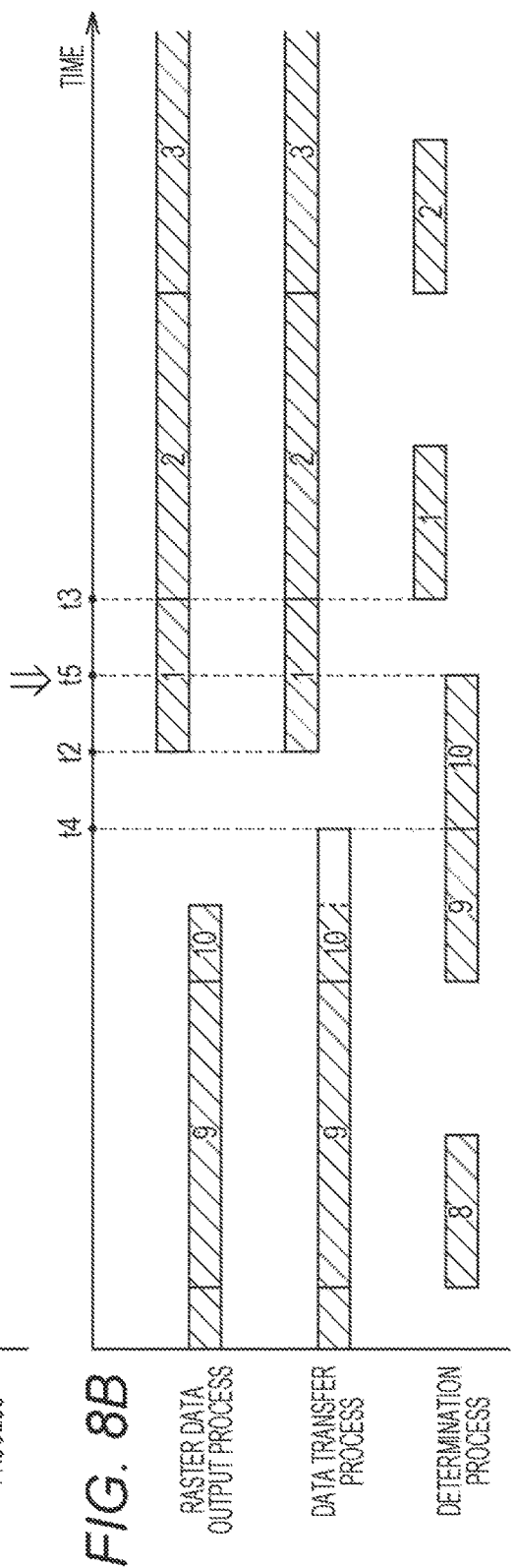
FIG. 8A
FIG. 8B

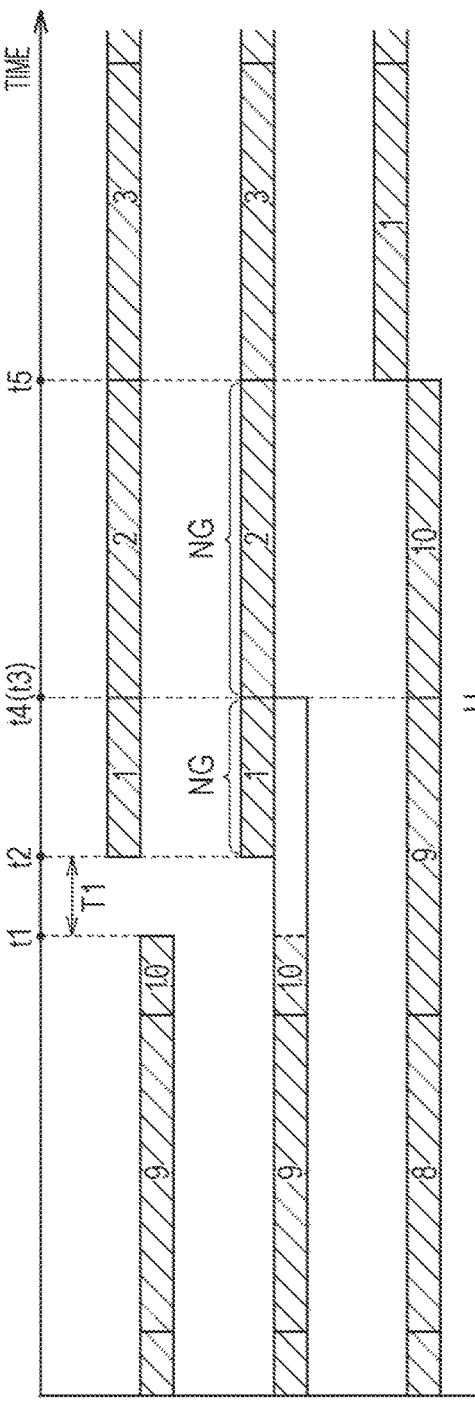
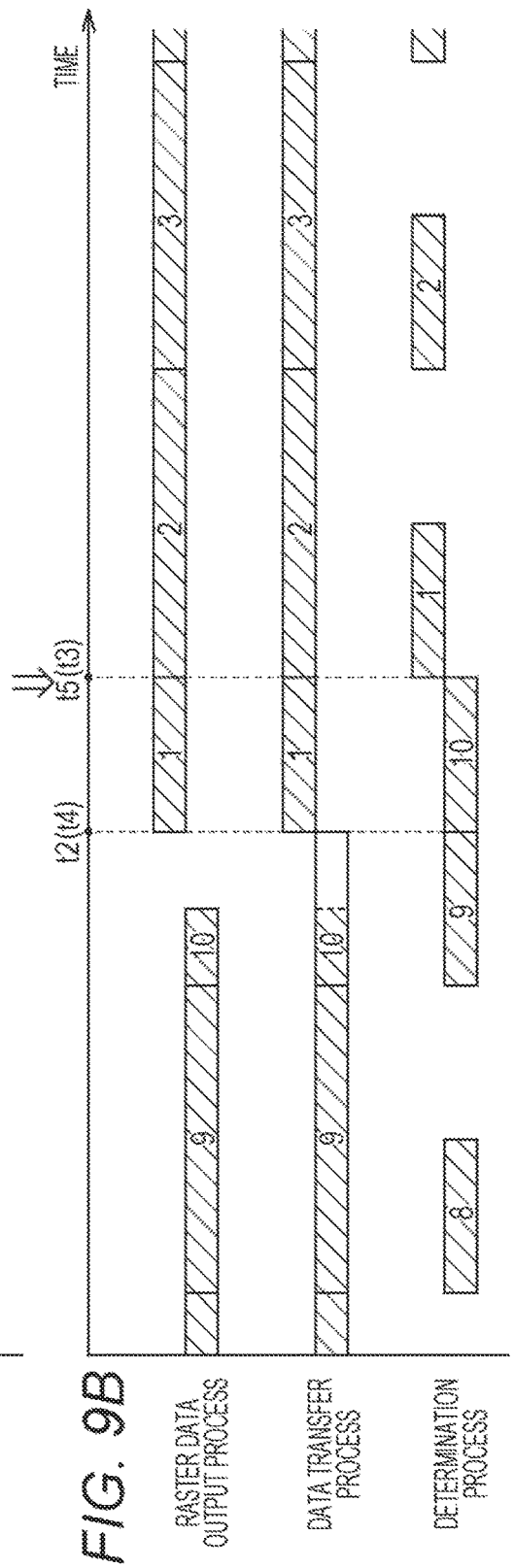

IMAGE PROCESSING APPARATUS THAT PERFORMS DIFFERENT PROCESSES IN PARALLEL, METHOD, AND PROGRAM

Japanese Patent Application No. 2016160465 filed on Aug. 18, 2016, including description, claims, drawings, and abstract the entire disclosure is incorporated herein by reference in its entirety.

BACKGROUND

Technological Field

The present invention relates to an image processing apparatus, and particularly relates to an image processing apparatus that performs different processes in parallel.

Description of the Related art

A technology is conventionally known which checks whether or not a print target contains an image that is prohibited to be duplicated (hereinafter referred to as a specific image), such as a banknote and a negotiable instrument and, if it contains a specific image, prohibits printing.

For example, JP 2001-313820 A describes a technology for performing in parallel a process of determining whether or not print data contains a specific image and a process of generating output image data on the basis of the print data to promote an increase in the speed of an output apparatus.

Patent Literature 1: JP 2001-313820 A
Patent Literature 2: JP 9-234911 A
Patent Literature 3: JP 7-256953 A However, the time required for the process of determining whether or not an image presented by data of each page (hereinafter referred to as page data) contains a specific image may be longer than the time required for the process of generating output image data on the basis of the page data. Hence, even if both of the processes are performed in parallel as in the output apparatus described in JP 2001-313820 A, until one of the processes for certain page data is completed, the other process for the next page data cannot start. Therefore, standby time arises. Hence, an image processing apparatus is desired which can perform both of the processes in parallel on a plurality of pages at a higher speed.

SUMMARY

The present invention has been made to solve the above problem, and an object thereof is to provide an image processing apparatus, a method, and a program.

To achieve the abovementioned object, according to an aspect of the present invention, an image processing apparatus reflecting one aspect of the present invention comprises: a raster data output that executes a first process of outputting raster data obtained by developing print data; a data transferer that generates image determination-purpose data on the basis of divided data obtained by dividing the raster data from the raster data output, and executes a second process of storing the generated image determination-purpose data in a buffer, and a hardware processor that: executes a third process of determining whether or not an image presented by the image determination-purpose data stored in the buffer contains a specific image, generates schedule information indicating a time schedule of the first, second, and third processes, determines each set of raster data on whether or not the time schedule indicated by the schedule information satisfies an overflow condition, and upon having determined that the time schedule satisfies the overflow condition, performs control in such a manner as to extend the buffer, wherein the overflow condition is a condition that at least part of a period of the second process overlaps with at least part of a period during which the image determination-purpose data for which the third process has not been completed occupies an entire area of the buffer.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIGS. 8A and 8B are diagrams illustrating a time schedule of the raster data output process, the data transfer process, and the determination process in Example 1;

FIGS. 9A and 9B are diagrams illustrating a time schedule of the raster data output process, the data transfer process, and the determination process in Example 2;

DETAILED DESCRIPTION OF EMBODIMENTS

Figure 1:
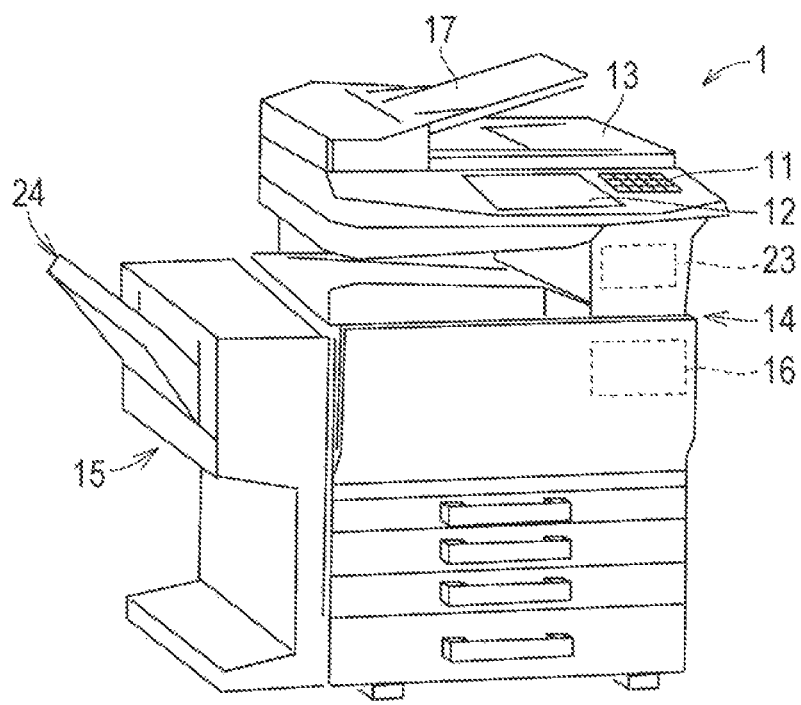
FIG. 1 is an external perspective view of an multi-functional peripheral (MFP) according to a first embodiment of the present invention.

Hereinafter, one or more embodiments of the present invention will be described in detail with reference to the drawings. However, the scope of the invention is not limited to the disclosed embodiments. The same reference numerals are assigned to the same or corresponding portions in the drawings, and their descriptions are not repeated.

In the following description, "specific image" is an image that is prohibited to be duplicated, such as a banknote and a negotiable instrument. "Image data" is data presenting various images such as a text and a photograph. "Print data" is image data targeted for printing. "Raster data" is data obtained by converting print data into a bitmap format where an image can be formed. "Divided data" is data obtained by dividing raster data. "Image determination-purpose data" is data that is generated on the basis of divided data, and that is targeted for a determination on whether or not a specific image is contained. Moreover, "rasterization process" indicates a process of rasterizing print data and outputting raster data.

First Embodiment

<Hardware Configuration of the MFP>

A multi-functional peripheral (MFP) being an example of an image processing apparatus according to a first embodiment of the present invention is an apparatus where various functions of copying, network printing, a scanner, a fax, a document server, and the like are incorporated. The MFP is described in detail below.

FIG. 1 is an external perspective view of the MIT according to the first embodiment. Moreover, FIG. 2 is a diagram illustrating the configuration of main hardware of the MFP.

Figure 2:
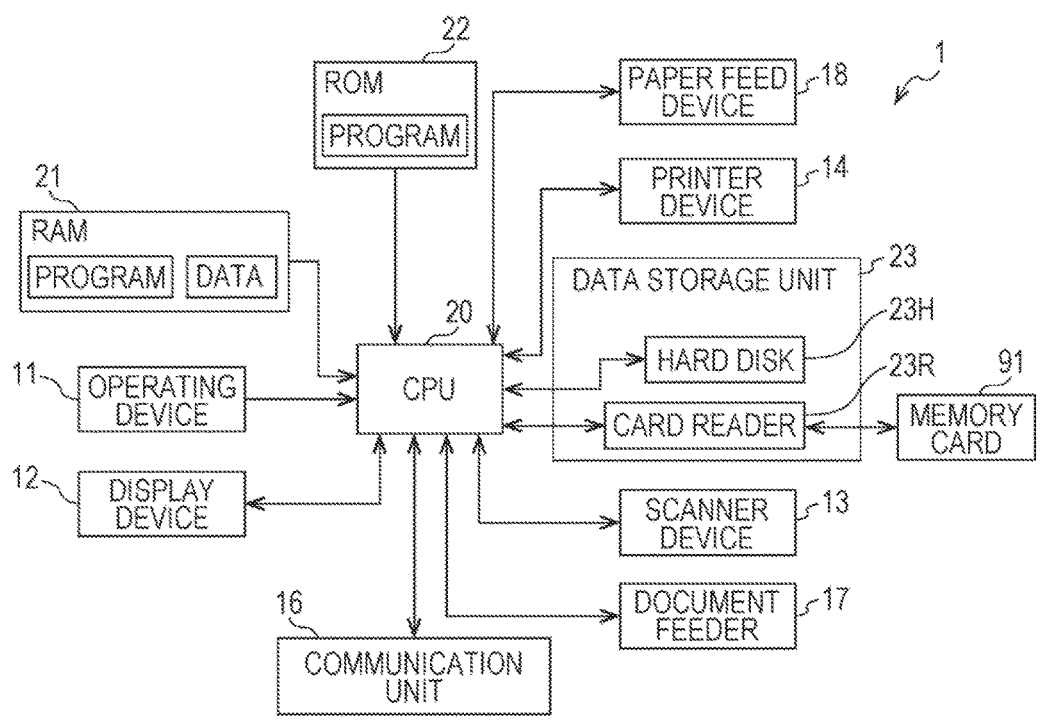
FIG. 2 is a diagram illustrating the configuration of main hardware of the MFP according to the first embodiment.

As illustrated in FIGS. 1 and 2, an MFP 1 includes an operating device 11, a display device 12, a scanner device 13, a printer device 14, a finisher device 15, a communication unit 16, a document feeder 17, a paper feed device 18, a CPU 20, a RAM 21, a ROM 22, and a data storage unit 23.

The operating device 11 is configured including a plurality of keys for inputting numerics, characters, symbols, and the like, a sensor for recognizing a pressed key, and a transmission-purpose circuit that transmits a signal indicating a recognized key to the CPU 20.

The display device 12 displays a screen for providing messages and instructions to a user, a screen for prompting the user to input a setting content and a processing content, a screen presenting an image formed by the MFP 1 and a processing result, and the like. For example, a touchscreen is used as the display device 12. In this case, the display device 12 has a function of detecting a position on the touchscreen where the user's finger has touched, and transmitting a signal indicating the detection result to the CPU 20.

In this manner, the operating device 11 and the display device 12 act as a user interface for allowing the user to directly operate the MFP 1.

The scanner device 13 photoelectrically reads image information such as photos, characters, and graphics from documents and acquires image data. The acquired image data is converted into digital data, on which various types of known image processing are performed. The digital data is then transmitted to the printer device 14 or the communication unit 16 for printing of the image or data transmission, is stored in the data storage unit 23 for later use.

The printer device 14 performs a printing process of printing an image presented by print data targeted for printing on a recording sheet such as paper or a film. The print data is image data acquired by the scanner device 13, image data received by the communication unit 16 from an external device, or image data stored in the data storage unit 23.

The paper feed device 18 is provided to a lower part of a main body of the MFP 1, and is used to supply a recording sheet suitable for an image targeted for printing to the printer device 14. A recording sheet on which the printer device 14 has printed an image, that is, printed matter, passes through the finisher device 15, undergoes processing such as stapling and punching in accordance with the mode setting, and then is discharged into a tray 24.

The communication unit 16 is configured including a transmission unit and a receiving unit, and includes a wireless communication device, a network interface card (NIC), a modem, or a terminal adapter (TA) for exchanging data with a mobile viewing terminal or electronic paper.

The data storage unit 23 includes a hard disk 23H and a card reader 23R. The card reader 23R reads data from a memory card 91 such as compact flash (registered trademark) or smart media, or writes data into the memory card 91. The memory card 91 is mainly used to exchange data with a personal computer not via a communication line, or to back up data.

Image data acquired by the scanner device 13 and image data received by the communication unit 16 from an external device are stored in the hard disk 23H. The data of the hard disk 23H is configured to be referable also from another image forming apparatus via a network.

The CPU 20 executes a program stored in the ROM 22 or a program loaded in the RAM 21 to control the entire MFP 1. The CPU 20 executes in parallel the rasterization process and a process of determining whether or not an image presented by print data contains a specific image.

<Functional Configuration of the MFP>

Figure 3:
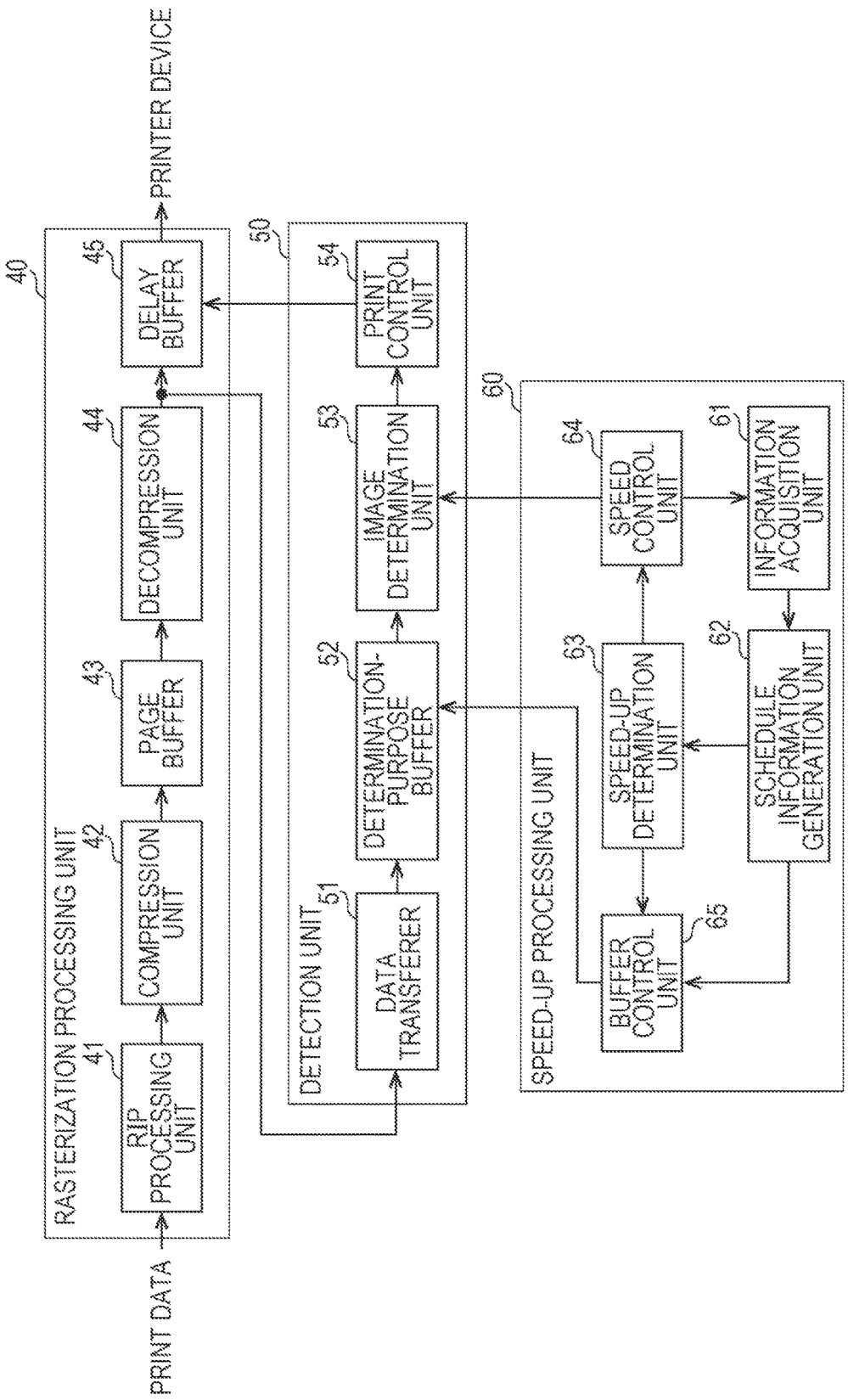
FIG. 3 is a diagram illustrating the functional configuration of the MFP according to the first embodiment.

FIG. 3 is a diagram illustrating a functional configuration included in the MFP 1. As illustrated in FIG. 3, the MFP 1 includes a rasterization processing unit 40, a detection unit 50, and a speed-up processing unit 60.

The rasterization processing unit 40, the detection unit 50, and the speed-up processing unit 60 are configured including blocks that are realized by the CPU 20 of FIG. 2 executing the program stored in the ROM 22, and the RAM 21. The rasterization processing unit 40, the detection unit 50, and the speed-up processing unit 60 may be configured including a combination of the blocks that are realized by the CPU 20 executing the program, the RAM 21, and a circuit.

The rasterization processing unit 40 rasterizes print data and outputs raster data. As illustrated in FIG. 3, the rasterization processing unit 40 includes a raster image processor (RIP) processing unit 41, a compression unit 42, a page buffer 43, a decompression unit 44, and a delay buffer 45.

The RIP processing unit 41 executes a RIP process on print data targeted for printing, the print data being stored in the hard disk 23H. Specifically, the RIP processing unit 41 converts the print data into raster data being data in a bitmap format in which an image can be formed.

The RIP processing unit 41 divides print data into pages (a first unit), sequentially executes the RIP process on data equal to one page (page data) obtained by the division, and generates raster data corresponding to each page.

The compression unit 42 sequentially compresses one page's worth of raster data generated by the RIP processing unit 41, and stores the compressed data in the page buffer 43.

The decompression suit 44 decompresses one page's worth of compressed data stored in the page buffer 43, and executes a raster data output process (a first process) of sequentially outputting the decompressed raster data. In other words, the decompression unit 44 functions as a raster data output that outputs raster data in the first unit (on a page basis) obtained by developing print data.

The decompression unit 44 stores raster data in the delay buffer 45 and also outputs the raster data to the detection unit 50.

The delay buffer 45 temporarily stores the raster data outputted from the decompression unit 44. The raster data stored in the delay buffer 45 is read at an appropriate timing, and outputted to the printer device 14. Consequently, the printer device 14 prints an image presented by the raster data on a recording sheet.

The detection unit 50 determines whether or not the image presented by the raster data outputted from the decompression unit 44 contains a specific image, and controls the data output from the delay buffer 45 to the printer device 14 according to the determination result.

As illustrated in FIG. 3, the detection unit 50 includes a data transferer 51, a determination-purpose buffer 52, an image determination unit (first determination unit) 53, and a print control unit 54.

The data transferer 51 generates image data on a band basis (hereinafter referred to as image determination-purpose data) on the basis of the divided data obtained by dividing one page's worth of raster data outputted from the decompression unit 44, and sequentially executes a data transfer process (a second process) of storing the generated image determination-purpose data in the determination-purpose buffer 52.

The size of one band is indicated by the width of raster data in the sub-scanning direction, that is, the number of lines of the raster data along the main scanning direction.

The data transferer 51 may perform predetermined image processing on image determination-purpose data upon generating the image determination-purpose data. For example, the data transferer 51 performs various types of image processing suitable for the process of determining a specific image, such as a resolution conversion process and a color conversion process.

The image determination unit 53 sequentially executes a determination process (a third process) of determining whether or not an image presented by one band's worth of image data contains a specific image.

Specifically, whenever image determination-purpose data is stored in the determination-purpose buffer 52, the image determination unit 53 determines whether or not an image presented by the image determination-purpose data contains a specific image. A method for the determination process of the image determination unit 53 is simply required to use a known technology such as an image recognition process, and uses, for example, a method disclosed in JP 2001-313820 A.

The image determination unit 53 outputs, to the print control unit 54, a result of determining each set of image determination-purpose data on whether or not to contain a specific image. The determination result includes a probability value of recognition based on the above image recognition process.

The determination-purpose buffer 52 is a memory for temporarily storing image determination-purpose data. The determination-purpose buffer 52 normally has a memory area of a capacity equal to two bands (hereinafter referred to as the normal area). Hence, it is possible to perform in parallel the data transferer 51's process of storing one band's worth of image determination-purpose data in the determination-purpose buffer 52 and the image determination unit 53's process of reading one band's worth of image determination-purpose data front the determination-purpose buffer 52.

The print control unit 54 determines whether or not to prohibit the printing of raster data on the basis of the determination result received from the image determination unit 53. Specifically, when having received the determination result that an image presented by image determination-purpose data contains a specific image, the print control unit 54 prohibits the printing of a page corresponding to the image determination-purpose data. In other words, the print control unit 54 displays, on the display device 12, a print error screen indicating information to the effect that printing is not allowed since a specific image is contained, without performing the process of outputting raster data of the page to the printer device 14.

On the other hand, when having received the determination result that all sets of image determination-purpose data configuring one page's worth of raster data do not contain a specific image, the print control unit 54 reads the raster data from the delay buffer 45 and outputs the raster data to the printer device 14.

The speed-up processing unit 60 increases the speed of the detection unit 50. The speed-up processing unit 60 includes an information acquisition unit 61, a schedule information generation unit 62, a speed-up determination unit (second determination unit) 63, a speed control unit 64, and a buffer control unit 65. The units of the speed-up processing unit 60 are described in detail below.

<Methods for the Raster Data Output Process, the Data Transfer Process, and the Determination Process>

Next, the raster data output process executed by the decompression unit 44, the data transfer process executed by the data transferer 51, and the determination process executed by the image determination unit 53, and a method for each process are described in detail.

Figure 4:
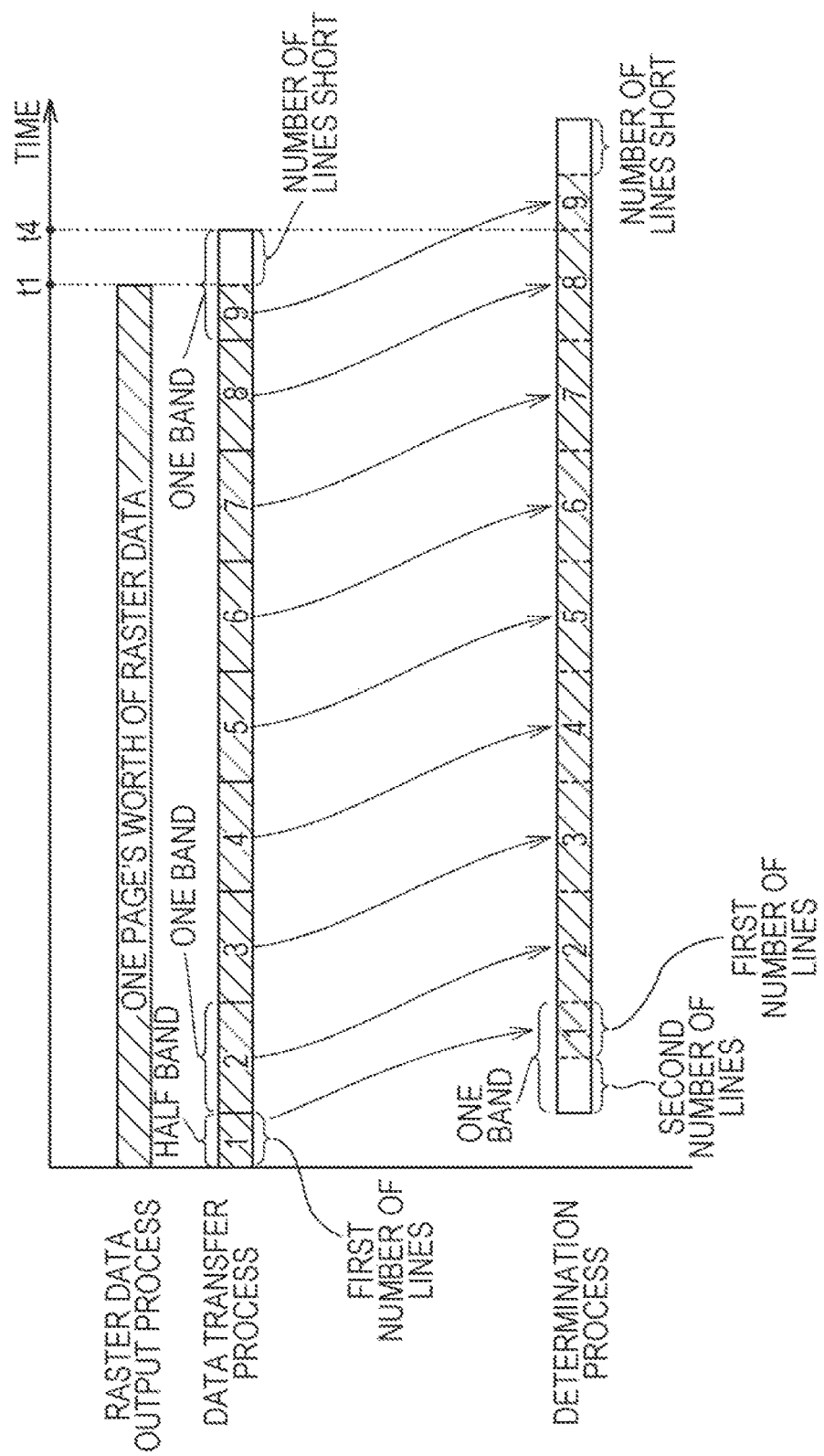
FIG. 4 is a timing chart of a raster data output process, a data transfer process, and a determination process for a first page of print data.

FIG. 4 is a timing chart of the raster data output process, the data transfer process, and the determination process for a first page of print data. In FIG. 4, the first row indicates the raster data output process by the decompression unit 44, the second row indicates the data transfer process by the data transferer 51 to the determination-purpose buffer 52, and the third row indicates the determination process by the image determination unit 53.

As described above, the image determination unit 53 executes the determination process on one band's worth of image data. On the other hand, the size of raster data varies, and is not limited to an integral multiple of one band. Moreover, in order to increase the determination accuracy of the image determination unit 53, it is preferable to increase the determination accuracy in an outer peripheral portion of an image.

Hence, as illustrated in FIG. 4, the data transferer 51 stores data obtained by performing image processing on divided data of a first predetermined number of lines (less than the number of tines of one band, for example, the number of lines of a half band) from the beginning in raster data outputted, as the first image determination-purpose data, in the determination-purpose buffer 52.

Moreover, the data transferer 51 stores blank data of a second predetermined number of lines (the number of lines obtained by subtracting the first predetermined number of lines front the number of lines of one band) (hereinafter referred to as top end-specific blank data) in the determination-purpose buffer 52.

The data transferer 51 performs image processing on data in predetermined units (units much smaller than one band). Whenever generating data in the predetermined units, on which image processing has been performed, the data transferer 51 then stores the data as storage target data in the determination-purpose buffer 52. At this point in time, if there is free space in the determination-purpose buffer 52, the data transferer 51 stores the storage target data in the free space, and if there is no free space, the data transferer 51 moves to processing for the next data in the predetermined unit without performing the data transfer process on the storage target data. Hence, if there is no free space, the storage target data is to become lost.

When the first image determination-purpose data has been stored in the determination-purpose buffer 52, the image determination unit 53 reads the image determination-purpose data and the top end-specific blank data frons the determination-purpose buffer 52. The image determination unit 53 executes the determination process on one band's worth of data being a combination of the read image determination-purpose data and top end-specific blank data.

The blank data is data indicating a solid white linage. The data transferer 51 stores the top end-specific blank data in the determination-purpose buffer 52 without performing any types of image processing. Hence, the data transferer 51 can store the top end-specific blank data in the determination-purpose buffer 52 much faster than the speed of the data transfer process of generating image determination-purpose data and storing it in the determination-purpose buffer 52. Hence, FIG. 4 does not illustrate the data transferer 51's process of storing the top end-specific blank data in the determination-purpose buffer 52. This point is the same in other drawings.

However, the data transferer 51 stores the top end-specific blank data in the determination-purpose buffer 52 until the timing when the image determination unit 53 starts the determination process for the first image determination-purpose data.

Consequently, the image determination unit 53 can perform the determination process including the outer peripheral portion at the top end of the raster data, and can increase the determination accuracy at the top end portion of the raster data.

When having completed the determination process for the one band's worth of image data, the image determination unit 53 deletes the one band's worth of data from the determination-purpose buffer 52. Consequently, the space is freed up on the determination-purpose buffer 52.

Moreover, the data transferer 51 generates, as the second and subsequent image determination-purpose data, image-processed divided data in bands subsequent to the first image determination-purpose data, and sequentially stores the image determination-purpose data in the determination-purpose buffer 52. Whenever the second and subsequent image determination-purpose data are stored in the determination-purpose buffer 52, the image determination unit 53 executes the determination process on the image determination-purpose data.

After completing the determination process for certain image determination-purpose data, the image determination unit 53 starts the determination process for the next image determination-purpose data. In other words, if the data transfer process for the next image determination-purpose data has been completed at the timing when the determination process for certain image determination-purpose data has been completed, the image determination unit 53 starts the determination process for the next image determination-purpose data. Moreover, unless the data transfer process for the next image determination-purpose data has been completed at the timing when the determination process for the certain image determination-purpose data has been completed, the image determination unit 53 waits until the data transfer process for the next image determination-purpose data is completed, and then starts the determination process for the next image determination-purpose data.

Moreover, the number of lines of the last image determination-purpose data in one page's worth of raster data does not always agree with the number of lines of one band. If the number of lines of the last image determination-purpose data is less than the number of lines of one band, the data transferer 51 stores the last image determination-purpose data in the determination-purpose buffer 52, and then stores, in the determination-purpose buffer 52, blank data equal to the number of lines short obtained by subtracting the number of lines of the last image determination-purpose data from the number of lines of one band (hereinafter referred to as shortage-specific blank data). Consequently, the image determination unit 53 can execute the determination process on one band's worth of data being a combination of the last image determination-purpose data and the shortage-specific blank data.

FIG. 4 illustrates as if the speed at the time when the data transferer 51 stores the shortage-specific blank data is the same as the data transfer speed of the image determination-purpose data. However, the data transferer 51 simply stores the shortage-specific blank data in the determination-purpose buffer 52 without performing any types of image processing. Accordingly, the data transferer 51 actually stores the shortage-specific blank data much faster than the data transfer speed.

However, until the determination process for the second from the last (the eighth from the beginning in FIG. 4) image determination-purpose data is completed, the second from the last and the last image determination-purpose data and the shortage-specific blank data occupy the normal area equal to two bands in the determination-purpose buffer 52. Hence, the data transferer 51 cannot store new data in the determination-purpose buffer 52.

Hence, for the sake of convenience, FIG. 4 depicts in such a manner that the shortage-specific blank data is stored over a period of time until the determination process for the second from the last image determination-purpose data is completed and the space is freed up on the determination-purpose buffer 52. This point is the same also in other drawings.

Figure 5:
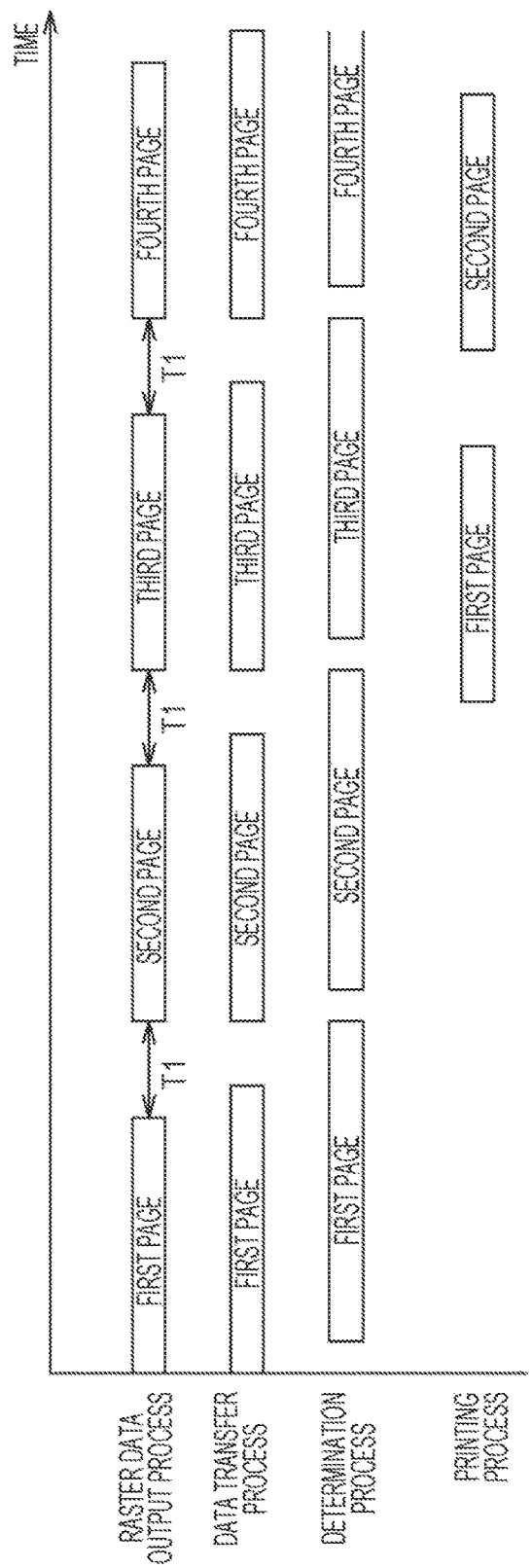
FIG. 5 is an example of a timing chart of the raster data output process, the data transfer process, the determination process, and a printing process for print data containing a plurality of pages.

FIG. 5 is an example of a timing chart of the raster data output process, the data transfer process, the determination process, and the printing process for print data containing a plurality of pages.

In FIG. 5, the first row indicates the raster data output process by the decompression unit 44, the second row indicates the data transfer process by the data transferer 51 to the determination-purpose buffer 52, the third row indicates the determination process by the image determination unit 53, and the fourth row indicates the printing process by the printer device 14.

As illustrated in FIG. 5, the decompression unit 44 starts outputting raster data of the second and subsequent pages at the timing when preset inter-paper time T1 passes since the output process for raster data of a previous page has been completed.

In the example illustrated in FIG. 5, the inter-paper time T1 is set in such a manner that the output process for raster data of the next page starts at the timing when the determination process for the last image determination-purpose data of each page has been completed.

When such sufficiently long inter-paper time T1 is set, there is time between the timing when the data transfer process for a certain page has been completed and the timing when raster data of the next page is outputted. Hence, the data transferer 51 can execute the data transfer process on two consecutive pages without trouble.

The printing process starts after the passage of predetermined time since the completion of the determination process by the image determination unit 53.

<Problems of the Case Where the Inter-paper Time is Reduced>

If the inter-paper time T1 is sufficiently long as illustrated in FIG. 5, there arises a problem that the time between when the raster data output process for the first page starts and when the determination process for the last page is completed is increased. Hence, it is conceivable to reduce the inter-paper time T1. However, if the inter-paper time T1 is reduced, a new problem arises. This point is described below.

FIGS. 6A to 6E are tinting charts of the raster data output process, the data transfer process, and the determination process for the case where the inter-paper time T1 is reduced. FIGS. 6A to 6E illustrate, in an enlarged manner, a period during which the process shifts from the first page to the second page. Examples illustrated in FIGS. 6A to 6E are examples of a case where the speeds of the raster data output process, the data transfer process, and the determination process are the same, and the first number of lines is a half band.

Moreover, in FIGS. 6A to 6E, let the timing when the output process for raster data of the first page is completed be timing t1, let the timing when the output process for raster data of the second page starts be timing t2, let the timing when the data transfer process for the first image determination-purpose data of the second page is completed be timing t3, let the timing when the determination process for the second from the last image determination-purpose data of the first page is completed be timing t4, and let the timing when the determination process for the last image determination-purpose data of the first page is completed be timing t5.

Figure 6A:
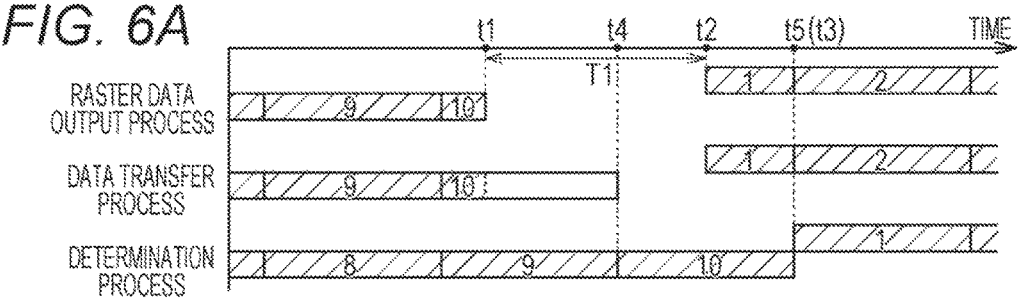
FIGS. 6A to 6E are timing charts of the raster data output process, the data transfer process, and the determination process for a case where inter-paper time T1 is reduced.

FIG. 6A is an example of a case where the inter-paper time T1 is set in such a manner that timing t5 agrees with timing t3.

This case allows time between timing t4 and timing t2. Hence, the data transferer 51 can continuously execute the data transfer process on a plurality of pages without trouble.

Moreover, since timing t5 agrees with timing t3, the image determination unit 53 can continuously execute the determination process on a plurality of pages without problems.

Figure 6B:
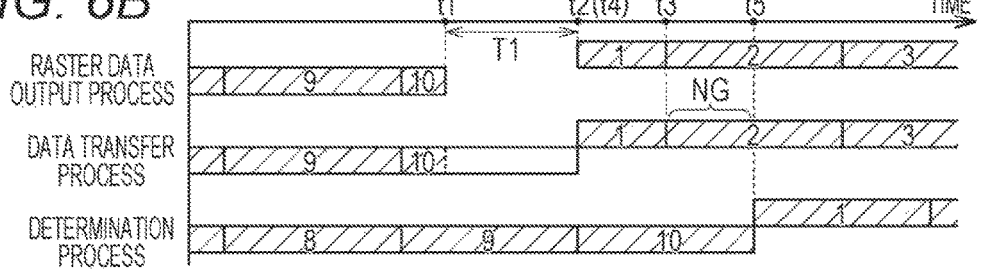

FIG. 6B is an example of a case where the inter-paper time T1 is further reduced as compared to FIG. 6A. In other words, it is an example of a case where the inter-paper time T1 is set in such a manner that timing t5 when the determination process for the first page is completed is after timing t3 when the first data transfer process for the second page is completed, and timing t4 when the second from the last determination process for the first page is completed agrees with timing t2 when the first data transfer process for the second page starts.

In this case, timing t4 agrees with timing t2. Accordingly, the data transferer 51 can continuously perform the data transfer process on a plurality of pages without problems. In other words, the data transferer 51 can store the first image determination-purpose data and the top end-specific blank data of the second page in the free space of the determination-purpose buffer 52 where the second from the last image determination-purpose data of the first page was stored.

However, at timing t3 when the first data transfer process for the second page is completed, the image determination unit 53 has not yet completed the last determination process for the first page. In short, the last image determination-purpose data for the first page, the shortage-specific blank data of the first page, the first image determination-purpose data of the second page, and the top end-specific blank data of the second page, for which the determination process has not yet been completed, occupy the entire normal area of the determination-purpose buffer 52.

Hence, the data transferer 51 cannot perform the second data transfer process for the second page until timing t5 when the last determination process for the first page is completed. As a result, there arises a problem that part of the second image determination-purpose data of the second page is lost.

Figure 6C:
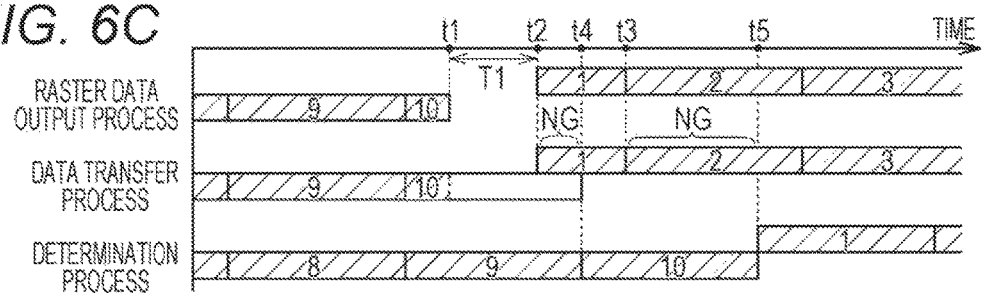

FIG. 6C is an example of a case where the inter-paper time T1 is further reduced as compared to FIG. 6B. In other words, it is an example where the inter-paper time T1 is set in such a manner that timing t2 when the first data transfer process for the second page starts comes slightly before timing t4 when the second from the last determination process for the first page is completed.

In this case, at timing t2 when the first data transfer process for the second page starts, the last image determination-purpose data of the first page, the shortage-specific blank data of the first page, the image determination-purpose data of the first page, and the top end-specific blank data of the second page still occupy the entire normal area of the determination-purpose buffer 52.

Hence, the data transferer 51 cannot perform the first data transfer process on the second page until timing t4 when the second from the last determination process for the first page is completed. Hence, there arises a problem that part of the first image determination-purpose data of the second page is lost.

At timing t4, the second from the last image determination-purpose data of the first page is then deleted from the determination-purpose buffer 52. Accordingly, the data transferer 51 can perform the data transfer process from timing t4 to timing t3. Specifically, the data transferer 51 stores part (a quarter band) of the first image determination-purpose data and the top end-specific blank data (three-fourths of a band) of the second page in the determination-purpose buffer 52.

However, at timing t3, the normal area of the determination-purpose buffer 52 is filled with the data for Which the determination process has not yet been completed. Hence, as in FIG. 6B, the data transferer 51 cannot store the second image determination-purpose data of the second page from timing t3 to timing t5 when the last determination process for the first page is completed. As a result, there arises a problem of data loss.

Figure 6D:
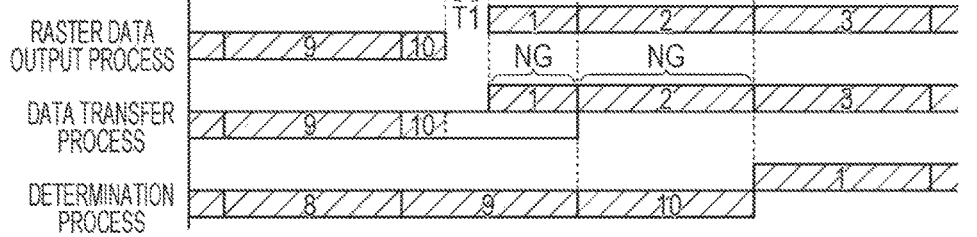

FIG. 6D is an example of a case where the inter-paper time T1 is further reduced as compared to FIG. 6C. In other words, it is an example where the inter-paper time T1 is set in such a manner that timing t4 when the second from the last determination process for the first page is completed agrees with timing t3 when the first data transfer process for the second page is completed.

Also in this case, the data transferer 51 cannot perform the data transfer process on new image determination-purpose data from timing t2 to timing t4, as in FIG. 6C. Moreover, the data transferer 51 cannot perform the data transfer process on new image determination-purpose data also from timing t3 to timing t5, as in FIGS. 6B and 6C. As a result, there arises the problem of data loss.

Figure 6E:
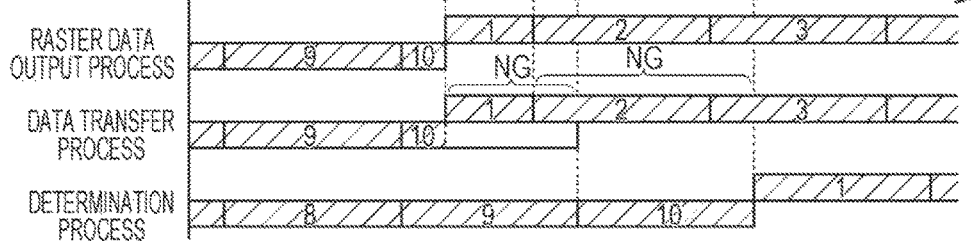

FIG. 6E is an example of a case where the inter-paper time T1 is set at zero. In other words, it is an example where timing t1 when the raster data output process for the first page is completed agrees with timing t2 when the raster data output process for the second page starts (that is, the timing when the first data transfer process for the second page starts).

Also in this case, the data transferer 51 cannot perform the data transfer process on new image determination-purpose data from timing t2 to timing t4, as in FIGS. 6C and 6D. Moreover, the data transferer 51 cannot perform the data transfer process on new image determination-purpose data also from timing t3 to timing t5, as in FIGS. 6B, 6C, and 6D. As a result, there arises the problem of data loss.

<Configuration of the Speed-up Processing Unit>

As illustrated in FIGS. 6A to 6E, if the inter-paper time T1 is reduced, there arises the problem of data loss. Hence, the MFP 1 of the first embodiment includes the speed-up processing unit 60. The configuration of the speed-up processing unit 60 is described below.

FIG. 3 is referred to again. The speed-up processing unit 60 includes the information acquisition unit 61, the schedule information generation unit 62, the speed-up determination unit (second determination unit) 63, the speed control unit 64, and the buffer control unit 65.

The information acquisition unit 61 acquires the following information (1) to (9):
(1) The value of the speed that the decompression unit 44 outputs raster data (hereinafter referred to as the raster data output speed value) (unit: the number of lines/time),
(2) The value of the speed of the data transfer process by the data transferer 51 (hereinafter referred to as the data transfer speed value) (unit: the number of lines/time),
(3) The inter-paper time T1,
(4) The value of the speed of the determination process by the image determination unit 53 (hereinafter referred to as the determination speed value) (unit: the number of lines/time),
(5) The number of lines included in one band (hereinafter referred to as the number of lines of one band),
(6) The first number of lines,
(7) The number of lines of each page targeted for printing (hereinafter referred to as the line total),
(8) The number of lines of the last image determination-purpose data of each page targeted for printing (hereinafter referred to as the number of bottom end lines L), and
(9) The number of sets of image determination-purpose data M of each page targeted for printing.

The raster data output speed value is preset according to the performance of the compression unit 42 and the decompression unit 44, and is stored in the ROM 22. The data transfer speed value is preset according to the performance of a processor configuring the data transferer 51 and the specifications of the determination-purpose buffer 52, and is stored in the ROM 22. The processing speed of the data transferer 51 is higher than that of the decompression unit 44. The data transfer speed of the data transferer 51 is limited to the raster data output speed of the previous stage. Hence, the data transfer speed value is set at the same value as the raster data output speed value.

The number of lines of one band is preset according to the capacity allocated to the determination-purpose buffer 52, and is stored in the ROM 22. The first number of lines is preset by a developer/designer of the MFP 1, and is stored in the ROM 22.

Hence, the information acquisition unit 61 is simply required to acquire, from the ROM 22, the raster data output speed value, the data transfer speed value (=the raster data output speed value), the number of lines of one band, and the first number of lines.

The determination speed value is controlled by the speed control unit 64 as described below. Hence, the information acquisition unit 61 acquires the currently set determination speed value from the speed control unit 64.

An inter-paper time table where a print mode and the inter-paper time T1 are associated is stored in the ROM 22. The information acquisition unit 61 acquires, from the inter-paper time table, the inter-paper time T1 corresponding to the print mode selected by a user input.

For example, the print mode includes three modes: a normal mode, a high speed mode, and an ultra-high speed mode. The inter-paper time table where the normal mode is associated with the inter-paper time T1 illustrated in FIG. 6A, the high speed mode with the inter-paper time T1 illustrated in FIG. 6D, and the ultra-high speed mode with the inter-paper time T1=0 is stored in the ROM 22.

Moreover, the information acquisition unit 61 calculates the number of lines of each page on the basis of print data stored in the data storage unit 23, and sets the calculated number of lines as the line total. The information acquisition unit 61 calculates the number of bottom end lines L on the basis of the line total, the number of lines of one band, and the first number of lines of each page. Let the number of bottom end lines L of the n-th page be $L_n$ below.

Furthermore, the information acquisition unit 61 calculates the number of sets of image determination-purpose data M of each page on the basis of the line total and the first number of lines. Let the number of sets of image determination-purpose data M of the n-th page be $M_n$ below.

The schedule information generation unit 62 generates schedule information indicating a time schedule of the raster data output process, the data transfer process, and the determination process on the basis of various kinds of information acquired by the information acquisition unit 61, before these processes start. Specifically, the schedule information generation unit 62 generates schedule information indicating the timing to start the raster data output process for each set of raster data, and the timing to complete the data transfer process and the timing to complete the determination process for each set of image determination-purpose data.

The schedule information generation unit 62 regenerates schedule information whenever the information acquisition unit 61 acquires new information. A specific processing method of the schedule information generation unit 62 is described below.

The speed-up determination unit 63 determines the necessity or unnecessity of a speed-up process. Specifically, the speed-up determination unit 63 determines each set of raster data on whether or not the time schedule indicated by the schedule information satisfies an overflow condition.

The overflow condition is a condition that at least part of the period of the data transfer process overlaps with at least part of the period, during which image determination-purpose data on which the determination process has not been completed occupies the entire area of the determination-purpose buffer 52.

Specifically, the speed-up determination unit 63 determines that the overflow condition is satisfied if at least one of the following first and second conditions is satisfied.

First condition: timing t2 when the decompression unit 44 starts the output process for target raster data is before timing t4 when the image determination unit 53 completes the second from the last determination process for previous rater data.

Second condition: timing t3 when the data transferer 51 completes the first data transfer process for target raster data is before timing t5 when the image determination unit 53 completes the last determination process for previous raster data.

The speed-up determination unit 63 outputs a speed-up instruction to the speed control unit 64 if having determined for the first time that each set of print data satisfies at least one of the first and second conditions.

If the speed control unit 64 has changed the determination speed as described below, the speed-up determination unit 63 determines whether or not a time schedule indicated by new schedule information that has been regenerated by the schedule information generation unit 62 on the basis of the changed determination speed satisfies at least one of the first and second conditions. If having determined that the time schedule indicated by the new schedule information satisfies at least one of the first and second conditions, the speed-up determination unit 63 outputs a speed-up instruction to the buffer control unit 65.

The speed control unit 64 controls the determination speed of the image determination unit 53, and outputs the currently set determination speed value to the information acquisition unit 61.

Specifically, the speed control unit 64 sets a default value as the determination speed at the start of a new print job. The default value is preset according to the performance of a processor configuring the image determination unit 53. However, the default value is set at a value equal to or greater than the data transfer speed value (=the raster data output speed value).

When having received the speed-up instruction from the speed-up determination unit 63, the speed control unit 64 sets the determination speed at a high speed value higher than the default value (for example, double the default value). The high speed value is preset.

The speed control unit 64 changes the determination speed by a method such as (i) changing the number of clocks of the processor configuring the image determination unit 53, or (ii) temporarily configuring a processor allocated for a scanning process and a FAX process as part of the image determination unit 53.

When having received the speed-up instruction from the speed-up determination unit 63, the buffer control unit 65 extends the determination-purpose buffer 52. The buffer control unit 65 determines the capacity of an extended area in the determination-purpose buffer 52 by a method described below.

The buffer control unit 65 uses, as the determination-purpose buffer 52, a memory area allocated for another process such as the scanning process or the FAX process to extend the determination-purpose buffer 52. Hence, while the determination-purpose buffer 52 is being extended, the scanning process or the FAX process is interrupted, the processing speed is limited, or the function is limited.

If the buffer control unit 65 has extended the determination-purpose buffer 52, the data transferer 51 gives a higher priority to the normal area than the extended area, and stores data in the determination-purpose buffer 52. In other words, the data transferer 51 stores data first in free space of the normal area if both of the extended area and the normal area have free space.

<Schedule Information Generation Method>

Next, a schedule information generation method by the schedule information generation unit 62 is described. Let the number of pages contained in print data be N here.

The schedule information generation unit 62 sets the timing when the decompression unit 44 starts the raster data output process for the first page as a reference timing, and generates schedule information indicating times from the reference timing to the start of the raster data output process for each page, to the completion of the data transfer process for each set of image determination-purpose data, and to the completion of the determination process for each set of image determination-purpose data.

Firstly, the schedule information generation unit 62 calculates time T4_n from the reference timing to the start of the raster data output process for the n-th page (n is an integer from 1 to N), in accordance with Math. 1 below.

$$T4\_n = \begin{cases} 0 & \text{(Case of } n = 1) \\ T1 \times (n-1) + \sum_{m=1}^{n} \frac{L(m)}{S_L} & \text{(Case of } n \geq 2) \end{cases} \quad [\text{Math. 1}]$$

In Math. 1, L(m) indicates the line total of the m-th page, and $S_L$ indicates the raster data output speed value.

Next, the schedule information generation unit 62 calculates time T5_n_k from the reference timing to the completion of the k-th data transfer process (k is an integer from 1 to $M_n$) of the n-th page (n is an integer from 1 to N) ($M_n$ is the number of sets of image determination-purpose data of the n-th page), in accordance with Math. 2 below.

$$T5\_n\_k = \begin{cases} \dfrac{F_L}{S_T} & \text{(Case of } n = 1, k = 1) \\ T4\_n + \dfrac{F_L}{S_T} & \text{(Case of } n \geq 2, k = 1) \\ T5\_n\_1 + \dfrac{B_L}{S_T} \times (k-1) & \text{(Case of } M_n > k \geq 2) \\ T5\_n\_(M_n - 1) + \dfrac{L_n}{S_T} & \text{(Case of } k = M_n) \end{cases} \quad [\text{Math. 2}]$$

In Math. 2, $F_L$ indicates the first number of lines, $S_T$ indicates the data transfer speed value, $B_L$ indicates the number of lines of one band, and indicates the number of bottom end lines of the m-th page.

Next, the schedule information generation unit 62 calculates time T6_n_k from the reference timing to the completion of the k-th determination process for the n-th page, in accordance with Math. 3 below.

$$T6\_n\_k = \begin{cases} T5\_1\_1 + \dfrac{B_L}{S_D} & \text{(Case of } n = 1, \\ & k = 1) \\ \text{MAX}\{T5\_1\_k, T6\_1\_(k-1)\} + \dfrac{B_L}{S_D} & \text{(Case of } n = 1, \\ & k \geq 2) \\ \text{MAX}\{T5\_n\_k, T6\_(n-1)\_M_{(n-1)}\} + \dfrac{B_L}{S_D} & \text{(Case of } n \geq 2, \\ & k = 1) \\ \text{MAX}\{T5_{n_k}, T6_{n_{k-1}}\} + \dfrac{B_L}{S_D} & \text{(Case of } n \geq 2, \\ & k \geq 2) \end{cases} \quad \text{[Math. 3]}$$

In Math. 3, $S_D$ indicates the determination speed value, and $B_L$ indicates the number of lines of one band. Moreover, MAX (A, B) indicates the value of A or B, whichever is larger.

<Method for Determining the Capacity of the Extended Area of the Determination-Purpose Buffer>

Next, a method for determining the capacity of the extended area of the determination-purpose buffer 52 by the buffer control unit 65 is described.

The buffer control unit 65 calculates image determination delay time T2 and storage delay time T3, which are illustrated below, on the basis of the schedule information generated by the schedule information generation unit 62.

The image determination delay time T2 is time from timing t3 when the data transfer process for the first image determination-purpose data of each of the second and subsequent pages is completed (refer to FIGS. 6A to 6E) to timing t5 when the last determination process of a previous page is completed (refer to FIGS. 6A to 6E).

The storage delay time T3 is time from timing t2 when the raster data output process for each of the second and subsequent pages starts (refer to FIGS. 6A to 6E) to timing t4 when the second from the last data transfer process of a previous page is completed (refer to FIGS. 6A to 6E).

The buffer control unit 65 extracts time T6_(n−1)_M$_{(n-1)}$ from the reference timing to the completion of the last (the M$_{(n-1)}$-th) determination process for the (n−1)-th page, and time T5_n_1 from the reference timing to the completion of the first data transfer process for the n-th page, from the schedule information, for each of the second and subsequent pages. The buffer control unit 65 sets a difference between the time T6_(n−1)_M$_{(n-1)}$ and the time T5_n_1 as the image determination delay time T2 if the time T6_(n−1)_M$_{(n-1)}$ is longer than the time Moreover, the buffer control unit 65 extracts time T6_(n−1)_M$_{(n-1)}$−1) from the reference timing to the completion of the second from the last ((M$_{(n-1)}$−1)-th) determination process for the (n−1)-th page and time T4_n from the reference timing to the start of the raster data output process for the n-th page, from the schedule information, for each of the second and subsequent pages. The buffer control unit 65 sets a difference between the time T6_(n−1)_(M$_{(n-1)}$−1) and the time T4_n as the storage delay time T3 if the time T6_(n−1)_(M$_{(n-1)}$−1) is longer than the time T4_n.

The buffer control unit 65 uses time Td of the calculated image determination delay time T2 or storage delay time T3, whichever is longer, to determine a minimum amount of the capacity of the buffer to be extended (the minimum buffer extension amount) in accordance with Equation (1) below:

The minimum buffer extension amount=the time Td×the data transfer speed value×one line's capacity      Equation (1)

where "one line's capacity" indicates the capacity of one line worth's of image determination-purpose data.

In other words, if the time schedule satisfies only the first condition, the buffer control unit 65 sets the storage delay time T3 as the time Td to determine the minimum buffer extension amount by Equation (1) above. The buffer control unit 65 then extends the determination-purpose buffer 52 by a capacity equal to or greater than the determined minimum buffer extension amount. Consequently, the buffer control unit 65 can extend the determination-purpose buffer 52 by a capacity that allows the data transferer 51 to perform the data transfer process for the storage delay time T3.

Moreover, if the time schedule satisfies only the second condition, the buffer control unit 65 sets the image determination delay time T2 as the time Td to determine the minimum buffer extension amount by Equation (1) above. The buffer control unit 65 then extends the determination-purpose buffer 52 by a capacity equal to or greater than the determined minimum buffer extension amount. Consequently, the buffer control unit 65 can extend the determination-purpose buffer 52 by a capacity that allows the data transferer 51 to perform the data. transfer process for the image determination delay time T2.

Furthermore, if the time schedule satisfies both of the first and second conditions, the buffer control unit 65 uses the time Td of the image determination delay time T2 or the storage delay time T3, whichever is longer, to determine the minimum buffer extension amount by Equation (1) above. The buffer control unit 65 is then required to extend the determination-purpose buffer 52 by a capacity equal to or greater than the determined minimum buffer extension amount.

<Flow of Processes>

Figure 7:
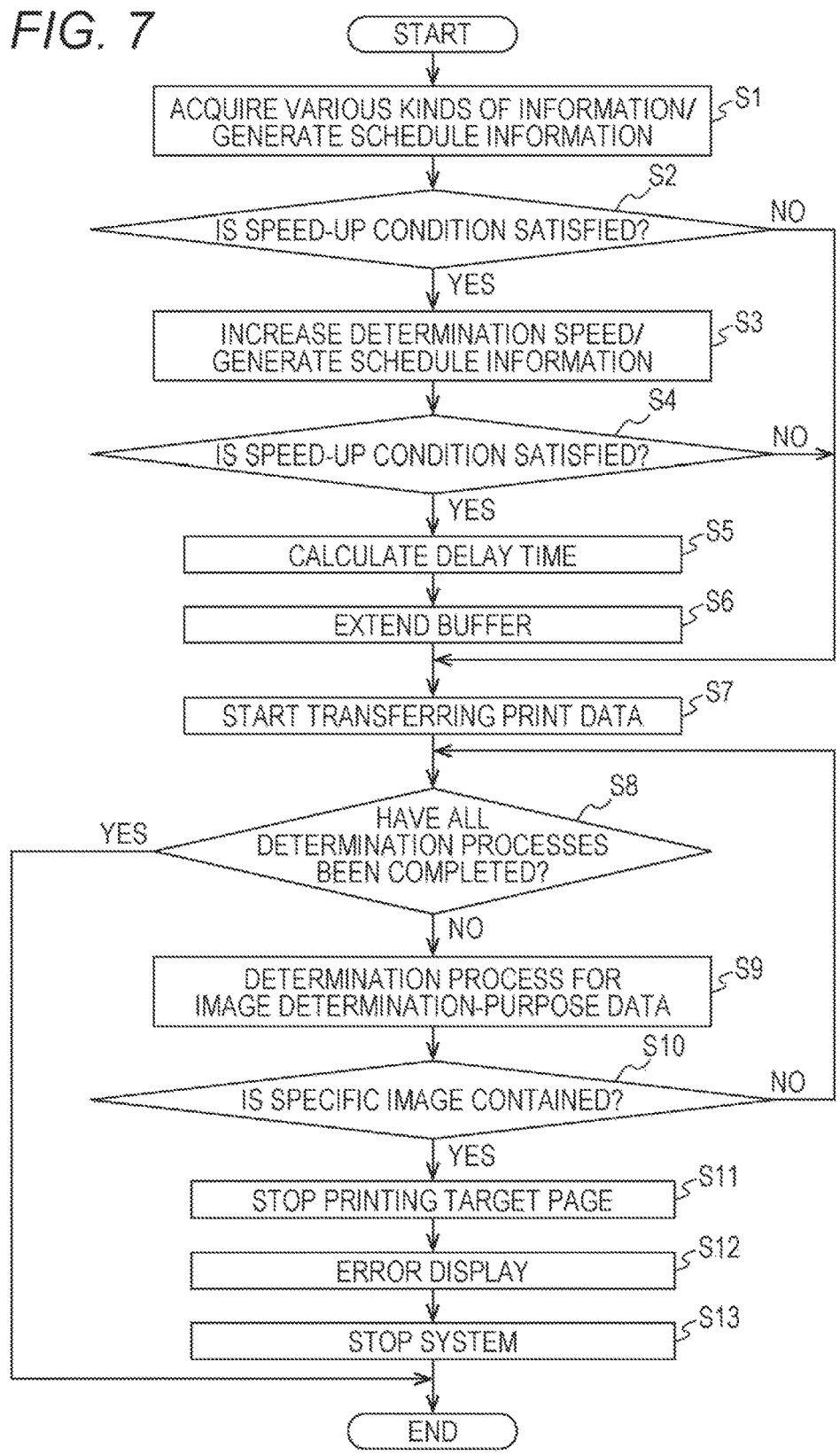
FIG. 7 is a flowchart illustrating the flow of processes in the MFP according to the first embodiment.

FIG. 7 is a flowchart illustrating the flow of processes in the MFP 1. As illustrated in FIG. 7, when the MFP 1 has accepted an instruction to start a print job, the information acquisition unit 61 acquires various kinds of information (step S1). Specifically, the information acquisition unit 61 acquires the raster data output speed value, the data transfer speed value, the inter-paper time T1, the determination speed value, the number of lines of one band, the first number of lines, the line total of each page, the number of bottom end lines L of each page, and the number of sets of image determination-purpose data M of each page.

Moreover, in step S1, the speed control unit 64 sets the determination speed of the image determination unit 53 at the default value and transmits the default value as the determination speed value to the information acquisition unit 61. The schedule information generation unit 62 then generates schedule information on the basis of the information acquired by the information acquisition unit 61.

Next, the speed-up determination unit 63 determines whether or not a time schedule indicated by the schedule information satisfies at least one of the first and second conditions (step S2).

If the time schedule satisfies at least one of the first and second conditions (YES in step 52), the speed-up determination unit 63 outputs a speed-up instruction to the speed control unit 64. The speed control unit 64 then changes the determination speed of the image determination unit 53 from the default value to the high speed value (step S3).

Moreover, in step S3, the information acquisition unit 61 acquires the high speed value as the determination speed value from the speed control unit 64. The schedule information generation unit 62 then regenerates schedule information on the basis of the information acquired by the information acquisition unit 61.

Next, the speed-up determination unit 63 determines whether or not a time schedule indicated by the newly generated schedule information satisfies at least one of the first and second conditions (step 54). If the time schedule satisfies at least one of the first and second conditions (YES in step S4), the speed-up determination unit 63 outputs a speed-up instruction to the buffer control unit 65.

The buffer control unit 65 calculates the image determination delay time T2 and the storage delay time T3 (step S5). If it has been determined in step S4 that the time schedule satisfies only the first condition, the buffer control unit 65 calculates only the storage delay time T3. If it has been determined in step 54 that the time schedule satisfies only the second condition, the buffer control unit 65 calculates only the image determination delay time T2 If it has been determined in step S4 that the time schedule satisfies both of the first and second conditions, the buffer control unit 65 calculates both of the image determination delay time T2 and the storage delay time T3.

The buffer control unit 65 then calculates the buffer capacity to be extended on the basis of the delay time calculated in step S5 in accordance with Equation (1) above. The buffer control unit 65 then extends the determination-purpose buffer 52 by the calculated buffer capacity (step S6). Execution moves to the process of step S7.

Moreover, if NO in step S2, or if NO in step S4, execution moves to the process of step S7.

In step S7, the rasterization processing unit 40 and the detection unit 50 start processing the target print data.

Next, the image determination unit 53 determines whether or not the determination process has been completed for raster data of all the pages (step S8). In other words, the image determination unit 53 determines whether or not raster data for which the determination process has not been completed is present.

If the determination process has not been completed for the raster data of all the pages (that is, if raster data for which the determination process has not been completed remains) (NO in step S8), the image determination unit 53 performs the determination process on the image determination-purpose data stored in the determination-purpose buffer 52, and outputs the determination result to the print control unit 54 (step S9).

The print control unit 54 determines whether or not the determination result indicates that a specific image is contained (step S10).

If the determination result indicates that a specific image is contained (YES in step S10), the print control unit 54 does not output, to the printer device 14, raster data of a page corresponding to the determination result. Consequently, the printing of the page is stopped (step S11).

Next, the print control unit 54 causes the display device 12 to display an error indicating that printing is not allowed (step S12), and the MFP 1 stops the system (step S13).

If the determination result does not indicate that a specific image is contained (NO in step S10), execution returns to the process of step S8. Moreover, if the determination process has been completed for the raster data of all the pages (YES in step S8), the MFP 1 ends the determination process for the target print data.

<Examples of the Processes in the MFP>

As described above, the MFP 1 according to the first embodiment includes the schedule information generation unit 62 that, when having received a print job, generates schedule information indicating a time schedule of the raster data output process, the data transfer process, and the determination process before these processes start. If the time schedule satisfies the first and second conditions, then the speed control unit 64 changes the determination speed of the image determination unit 53 to the high speed value. Moreover, if a time schedule indicated by schedule information that has been regenerated on the basis of the determination speed of the high speed value satisfies the first and second conditions, the buffer control unit 65 extends the determination-purpose buffer 52.

Consequently, even if the inter-paper time T1 is set short, the detection unit 50 can perform the determination process on all sets of image determination-purpose data without the occurrence of data loss. Consequently, the MFP 1 can achieve the speed-up process within the short inter-paper time T1.

In order to describe achieving the speed-up process without the occurrence of data loss, examples of the processes in the MFP 1 according to the first embodiment are described below. In the following examples, unless otherwise stated, it is assumed that an image presented by print data is two pages, and that the information acquisition unit 61 acquires the following information:

The data transfer speed value: same as the raster data output speed value,

The determination speed value: the default value (same as the data transfer speed), the high speed value (double the default value), The first number of lines: half the number of lines of one band, The number of bottom end lines L of each page: a quarter of the number of lines of one band, and The number of sets of image determination-purpose data M of each page: 10.

EXAMPLE 1

Example 1 is an example where the inter-paper time T1 illustrated in FIG. 6C is set.

FIGS. 8A and 8B are diagrams illustrating a time schedule of the raster data output process, the data transfer process, and the determination process in Example 1. FIG. 8A illustrates a case where the determination speed value is the default value (=the data transfer speed). FIG. 8B illustrates a case where the determination speed value is the high speed value (=double the data transfer speed).

As illustrated in FIG. 8A, timing t4 when the ninth (the second from the last) determination process for the first page is completed is after timing t2 when the raster data output process for the second page starts. Moreover, timing t5 when the tenth (last) determination process for the first page is completed is after timing t3 when the first data transfer process for the second page is completed. Hence, if the process starts in this state, data loss occurs in a period from timing t2 to timing t4 and a period from timing t3 to timing t5.

However, in the MFP 1 according to the first embodiment, it is determined in step S2 that the time schedule indicated by the schedule information satisfies the first and second conditions, and, in step S3, the speed control unit 64 changes the determination speed value to the high speed value that is double the data transfer speed value.

As illustrated in FIG. 8B, if the determination speed value is changed to the double of the data transfer speed value, timing t4 comes before timing t2. Consequently, the data transferer 51 can store the first image determination-purpose data of the second page in space of the determination-purpose buffer 52 that has been freed up by deleting the ninth image determination-purpose data of the first page for which the determination process has been performed. Hence, data loss does not occur.

Moreover, if the determination speed value is changed to the double of the data transfer speed value, timing t5 comes before timing t3. Consequently, the data transferer 51 can store the second image determination-purpose data of the second page in space of the determination-purpose buffer 52 that has been freed up by deleting the tenth image determination-purpose data of the first page for which the determination process has been performed. Hence, data loss does not occur.

EXAMPLE 2

Example 2 is an example where the inter-paper time T1 illustrated in FIG. 6D (shorter time than Example 1) is set.

FIGS. 9A and 9B are diagrams illustrating a time schedule of the raster data output process, the data transfer process, and the determination process in Example 2. FIG. 9A illustrates a case where the determination speed value is the default value (=the data transfer speed). FIG. 9B illustrates a case where the determination speed value is the high speed value double the data transfer speed).

As illustrated in FIG. 9A, also in Example 2, if the determination speed is the default value, timing t4 is after timing t2, and timing t5 is after timing t3, as in Example 1. Hence, in step S2 of FIG. 7, the speed-up determination unit 63 determines that the time schedule indicated by the schedule information satisfies the first and second conditions. In step S3, the speed control unit 64 changes the determination speed value to the high speed value that is double the data transfer speed value.

As illustrated in FIG. 9B, if the determination speed value is changed to the double of the data transfer speed value, timing t4 agrees with timing t2. Consequently, the data transferer 51 can store the first image determination-purpose data of the second page in the free space of the determination-purpose buffer 52, as in Example 1. Hence, data loss does not occur.

Moreover, if the determination speed value is changed to the double of the data transfer speed value, timing t5 agrees with timing t3. Consequently, the data transferer 51 can store the second image determination-purpose data of the second page in the free space of the determination-purpose buffer 52 as in Example 1. Hence, data loss does not occur.

EXAMPLE 3

Example 3 is the example, illustrated in FIG. 6E, where the inter-paper time is set at zero.

Figure 10A:
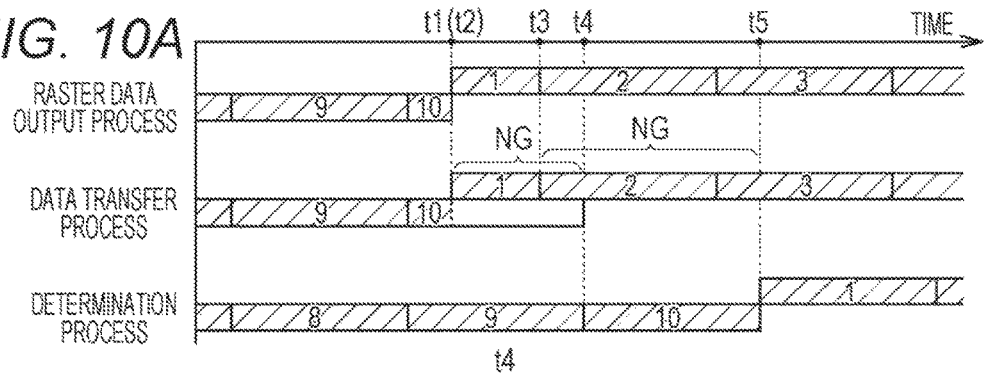
FIGS. 10A to 10C are diagrams illustrating a time schedule of the raster data output process, the data transfer process, and the determination process in Example 3.
Figure 10B:
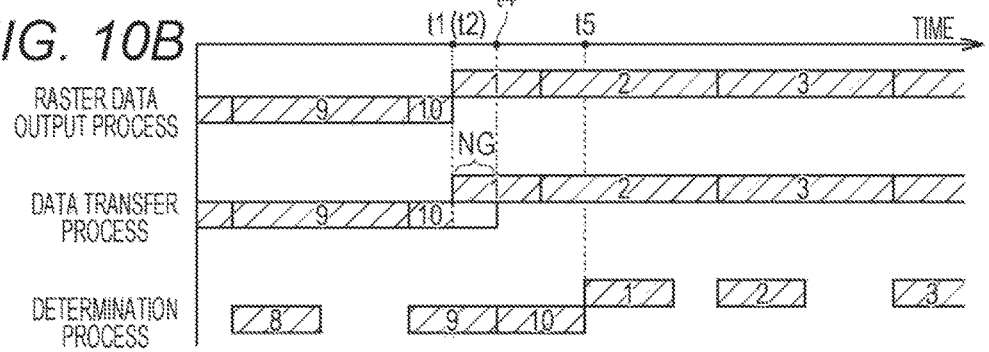
Figure 10C:
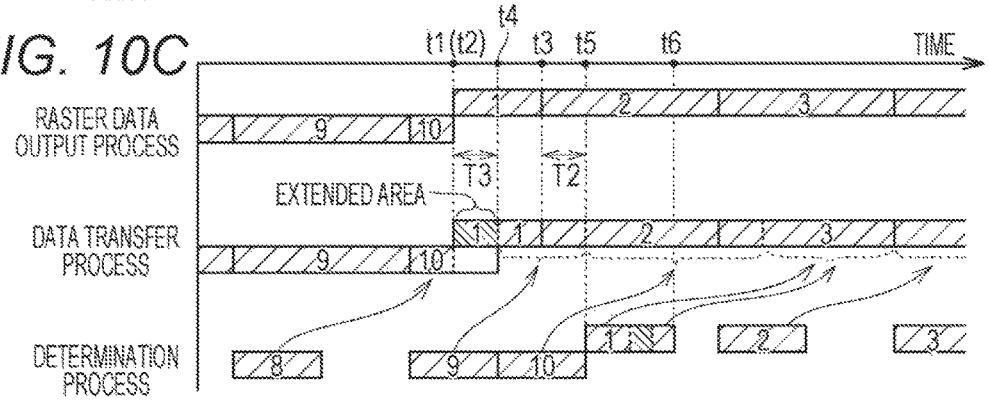

FIGS. 10A to 10C are diagrams illustrating a time schedule of the raster data output process, the data transfer process, and the determination process in Example 3. FIG. 10A illustrates a case where the determination speed value is the default value (=the data transfer speed). FIG. 10B illustrates a case where the determination speed value is the high speed value (=double the data transfer speed). Moreover, FIG. 10C is a diagram where hatching indicating image determination-purpose data that is stored in the extended area of the determination-purpose buffer has been added to FIG. 10B.

As illustrated in FIG. 10A, also in Example 3, if the determination speed value is the default value, timing t4 is after timing t2, and timing t5 is after timing t3, as in Example 1. Hence, in step S2, the speed-up determination unit 63 determines that the time schedule indicated by the schedule information satisfies the first and second conditions. In step S3, the speed control unit 64 then changes the determination speed value to the high speed value that is double the data transfer speed value.

As illustrated in FIG. 10B, even if the determination speed value is changed to the double of the data transfer speed value, timing t4 is after timing t2. Hence, if the process starts in this state, data loss occurs in the period from timing t2 to timing t4.

However, in the MFP 1 according to the first embodiment, the speed-up determination unit 63 determines in step S4 that the time schedule indicated by the schedule information that has been regenerated on the basis of the determination speed value of the high speed value satisfies the first and second conditions. The buffer control unit 65 then extends the determination-purpose buffer 52 in step S5.

Specifically, the buffer control unit 65 calculates the image determination delay time T2 from timing t3 to timing t5, and the storage delay time T3 from timing t2 to timing t4. In Example 3, T2 and T3 are the same. The buffer control unit 65 then extends the determination-purpose buffer 52 by a storable capacity (equal to a half band) by the data transferer 51 for the time T2 (=T3), in accordance with Equation (1) above.

As illustrated in FIG. 10C, the ninth and tenth image determination-purpose data and the shortage-specific blank data of the first page, for which the determination process has not yet been completed, occupy the entire normal area of the determination-purpose buffer 52 from timing t2 to timing t4. Hence, the data transferer 51 stores the first image determination-purpose data (a quarter band) of the second page in the extended area of the determination-purpose buffer 52.

Next, at timing t4, the ninth determination process for the first page is completed. As a result, one band's worth of space is freed up in the normal area of the determination-purpose buffer 52. Hence, the data transferer 51 stores the remainder (a quarter band) of the first image determination-purpose data of the second page, the top end-specific blank data (a half band), part (a quarter band) of the second image determination-purpose data of the second page, in the normal area of the determination-purpose buffer 52 from timing t4.

In FIG. 10C, arrows pointing from the determination process to the data transfer process indicate the relationship of free space in the normal area between the determination process that triggers the freeing of the space and the data transfer process to the free space. For example, an arrow at the left end in FIG. 10C indicates that the data transfer process to the space that has been freed up in the normal area by the completion of the determination process for the eighth image determination-purpose data is executed on the tenth image determination-purpose data. The same applies in the subsequent drawings.

Moreover, at timing t5, the tenth determination process for the first page is completed. As a result, one band's worth of space is freed up in the normal area of the determination-purpose buffer 52. Hence, the data transferer 51 stores the remainder (three-fourths of a band) of the second image determination-purpose data of the second page, and part (a quarter band) of the third image determination-purpose data of the second page in the normal area of the determination-purpose buffer 52 from timing t5.

Moreover, at timing to when the data transferer 51 is performing the second data transfer process for the second page, the first determination process for the second page is completed. As a result, (three-fourths of a band's worth of) space in the normal area and (a quarter band's worth of) space of the extended area in the determination-purpose buffer 52 are freed up.

Hence, the data transferer 51 stores the remainder (equal to three-fourths of a band) of the third image determination-purpose data of the second page in the normal area of the determination-purpose buffer 52.

The (h−2)-th (h is an integer equal to or greater than four) determination process for the second page is completed before the timing when the h-th data transfer process for the second page starts. Hence, the data transferer 51 can store the h-th image determination-purpose data of the second page in the normal area, freed up by deleting the (h−2) image determination-purpose data, in the determination-purpose buffer 52.

In this manner, even if the time schedule satisfies the first condition in step S4, the use of the extended area of the determination-purpose buffer 52 allows the MFP 1 to start the data transfer process for the next raster data in a situation where image determination-purpose data corresponding to previous raster data and shortage-specific blank data occupy the normal area of the determination-purpose buffer 52.

Moreover, even if the time schedule satisfies the second condition in step S4, the use of the extended area of the determination-purpose buffer 52 allows the MFP 1 to start the data transfer process for the second image determination-purpose data of the next raster data even in a situation where the last image determination-purpose data of previous raster data and the first image determination-purpose data of the next raster data occupy the normal area of the determination-purpose buffer 52.

In other words, in Example 3, the buffer control unit 65 extends the determination-purpose buffer 52 by a half band; accordingly, data loss can be prevented. Hence, the inter-paper time can be set at zero, and the speed of parallel processing of the rasterization process and the determination process can be increased.

In Example 3, only the first image determination-purpose data of the second page is stored in the extended area of the determination-purpose buffer 52.

EXAMPLE 4

Example 4 is an example of a case where the inter-paper time is zero and the high speed value of the determination speed is four-thirds of the data transfer speed.

Figure 11:
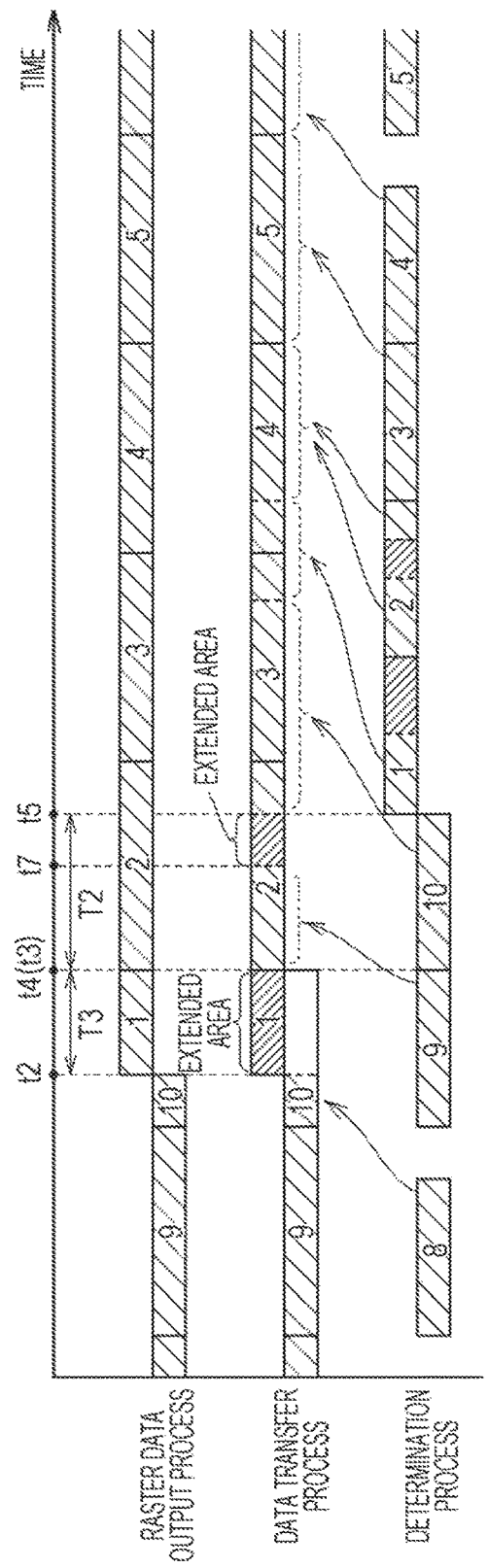
FIG. 11 is a diagram illustrating a time schedule of the raster data output process, the data transfer process, and the determination process for a case where a determination speed has been changed to a high speed value in Example 4.

FIG. 11 is a diagram illustrating a time schedule of the raster data output process, the data transfer process, and the determination process for a case where the determination speed has been changed to the high speed value, in Example 4.

In Example 4, it is determined in steps S2 and S4 that the time schedule indicated by the schedule information satisfies both of the first and second conditions, as in Example 3. Hence, in step S3, the speed control unit 64 changes the determination speed to four-thirds of the data transfer speed. Moreover, in step S6, the buffer control unit 65 extends the determination-purpose buffer 52.

In Example 4, the image determination delay time T2 is longer than the storage delay time T3. Hence, the buffer control unit 65 extends the determination-purpose buffer 52 by a storable capacity (equal to three-fourths of a band in Example 4) by the data transferer 51 for the time T2, in accordance with Equation (1) above.

As illustrated in FIG. 11, the ninth and tenth image determination-purpose data and the shortage-specific blank data of the first page, for which the determination process has not yet been completed, are stored in the entire normal area of the determination-purpose buffer 52 from timing t2 to timing t4. Hence, the data transferer 51 stores the first image determination-purpose data (a half band) of the second page in the extended area of the determination-purpose buffer 52.

Next, at timing t4, the ninth determination process for the first page is completed. As a result, one band's worth of space is freed up in the normal area of the determination-purpose buffer 52. Hence, the data transferer 51 stores the top end-specific blank data (a half band) and part (a half band) of the second image determination-purpose data of the second page in the normal area of the determination-purpose buffer 52 from tinting t4.

At timing t7 when the data transfer process for part (a half band) of the second image determination-purpose data of the second page is completed, the entire normal area of the determination-purpose buffer 52 is filled with the data for which the determination process has not yet been completed. Hence, the data transferer 51 stores part (a quarter band) of the second image determination-purpose data of the second page in the extended area of the determination-purpose buffer 52 from timing t7 to timing t5 when the tenth determination process for the first page is completed. Consequently, the entire extended area is filled with the data.

Next, at timing t5, the tenth determination process for the first page is completed. As a result, one band's worth of space is freed up in the normal area of the determination-purpose buffer 52. Hence, the data transferer 51 stores the remainder (a quarter band) of the second image determination-purpose data of the second page and part (three-fourths of a band) of the third image determination-purpose data of the second page in the normal area of the determination-purpose buffer 52 from timing t5.

After timing t5 onward, the data transferer 51 does not need to store the blank data (the top end-specific blank data or shortage-specific blank data). Hence, the data transfer process and the determination process are performed in parallel on each set of image determination-purpose data to gradually increase the free space in the extended area on the basis of the difference between the determination speed value and the data transfer speed value. Hence, the data transferer 51 can store image determination-purpose data in the determination-purpose buffer 52 without problems.

In this manner, in Example 4, the buffer control unit 65 extends the determination-purpose buffer 52 by three-fourths of a band. Accordingly, data loss can be prevented. Hence, the inter-paper time can be set at zero, and the speed of parallel processing of the rasterization process and the determination process can be increased.

In Example 4, the first and second image determination-purpose data of the second page are stored in the extended area of the determination-purpose buffer 52.

EXAMPLE 5

Example 5 is an example of a case where the inter-paper time is zero, the high speed value of the determination speed is four-thirds of the data transfer speed, and the number of bottom end lines L of the first page is one-tenth of the number of lines of one band.

Figure 12:
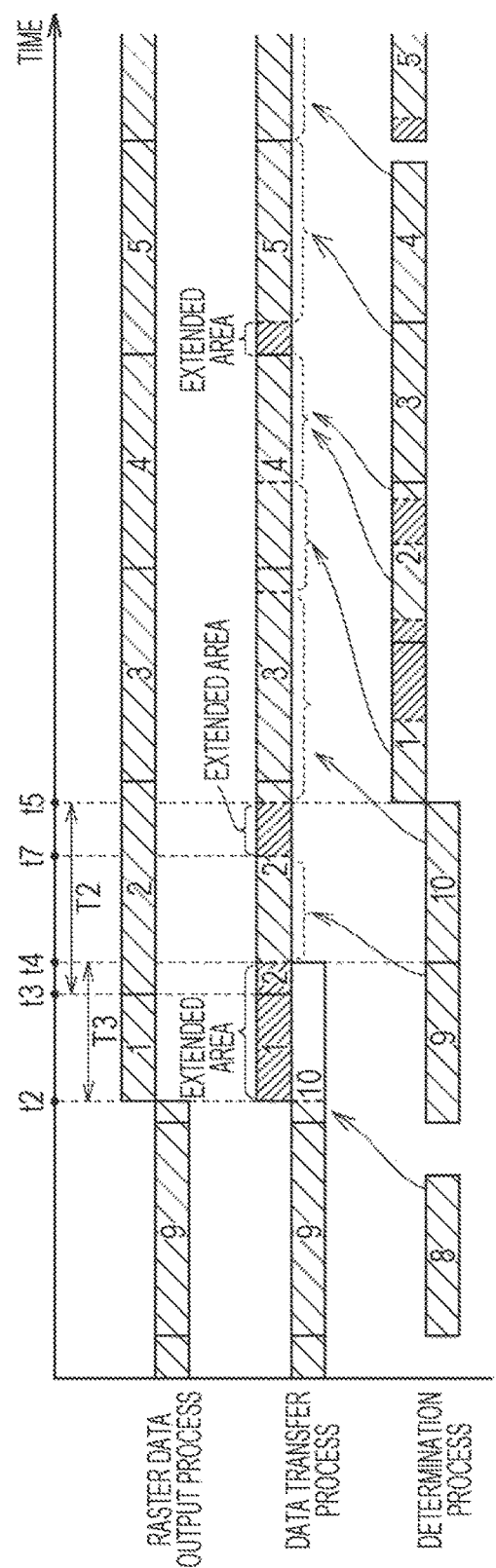
FIG. 12 is a diagram illustrating a time schedule of the raster data output process, the data transfer process, and the determination process for a case where the determination speed has been changed to the high speed value in Example 5.

FIG. 12 is a diagram illustrating a time schedule of the raster data output process, the data transfer process, and the determination process for a case where the determination speed has been changed to the high speed value in Example 5.

In Example 5, it is determined in steps S2 and S4 that the time schedule indicated by the schedule information satisfies both of the first and second conditions, as in Example 4. Hence, in step S3, the speed control unit 64 changes the determination speed value to four-thirds of the data transfer speed value. Moreover, in step S6, the buffer control unit 65 extends the determination-purpose buffer 52.

In Example 5, the image determination delay time T2 is longer than the storage delay time T3. Hence, the buffer control unit 65 extends the determination-purpose buffer 52 by a storable capacity (equal to nine-tenths of a band) by the data transferer 51 for the time T2, in accordance with Equation (1) above.

As illustrated in FIG. 12, the ninth and tenth image determination-purpose data and the shortage-specific blank data of the first page, for which the determination process has not yet been completed, occupy the entire normal area of the determination-purpose buffer 52 from timing t2 to timing t4. Hence, the data transferer 51 stores the first image determination-purpose data (a half band) of the second page and the second image determination-purpose data (three-twentieths of a band) of the second page in the extended area of the determination-purpose buffer 52.

At tinting t4, the ninth determination process for the first page is completed. As a result, one band's worth of space is freed up in the normal area of the determination-purpose buffer 52. Hence, the data transferer 51 stores the top end-specific blank data (a half band) and part (a half band) of the second image determination-purpose data of the second page in the normal area of the determination-purpose buffer 52 from timing t4.

At timing t7 when the data transfer process for the part (a half band) of the second image determination-purpose data of the second page is completed, the entire normal area of the determination-purpose buffer 52 is filled with the data for which the determination process has not yet been performed. Hence, the data transferer 51 stores part (a quarter band) of the second image determination-purpose data of the second page in the extended area of the determination-purpose buffer 52 from timing t7 to timing t5 when the tenth determination process for the first page is completed. Consequently, the entire extended area (equal to nine-tenths of a band) is filled with the data.

Next, at timing t5, the determination process for the tenth image determination-purpose data of the first page is completed. As a result, one band's worth of space is freed up in the normal area of the determination-purpose buffer 52. Hence, the data transferer 51 stores the remainder (one-tenths of a band) of the second image determination-purpose data of the second page and part (nine-tenths of a band) of the third image determination-purpose data of the second page in the normal area of the determination-purpose buffer 52 from timing t5.

After timing t5 onward, the data transferer 51 does not need to store the blank data (the top end-specific blank data or shortage-specific blank data). Hence, the data transfer process and the determination process are performed in parallel on each set of image determination-purpose data to gradually increase the free space in the extended area on the basis of the difference between the determination speed value and the data transfer speed value. Hence, the data transferer 51 can store image determination-purpose data in the determination-purpose buffer 52 without problems.

In this manner, in Example 5, the buffer control unit 65 extends the determination-purpose buffer 52 by nine-tenths of a band; accordingly, data loss can be prevented. Hence, the inter-paper time can be set at zero, and the speed of parallel processing of the rasterization process and the determination process can be increased.

In Example 5, the first, second, and fifth image determination-purpose data of the second page are stored in the extended area of the determination-purpose buffer 52.

EXAMPLE 6

Example 6 is an example of a case where the inter-paper time is zero, the high speed value of the determination speed is four-thirds of the data transfer speed, and the number of bottom end lines L of the first page is the same as the number of lines of one band.

Figure 13:
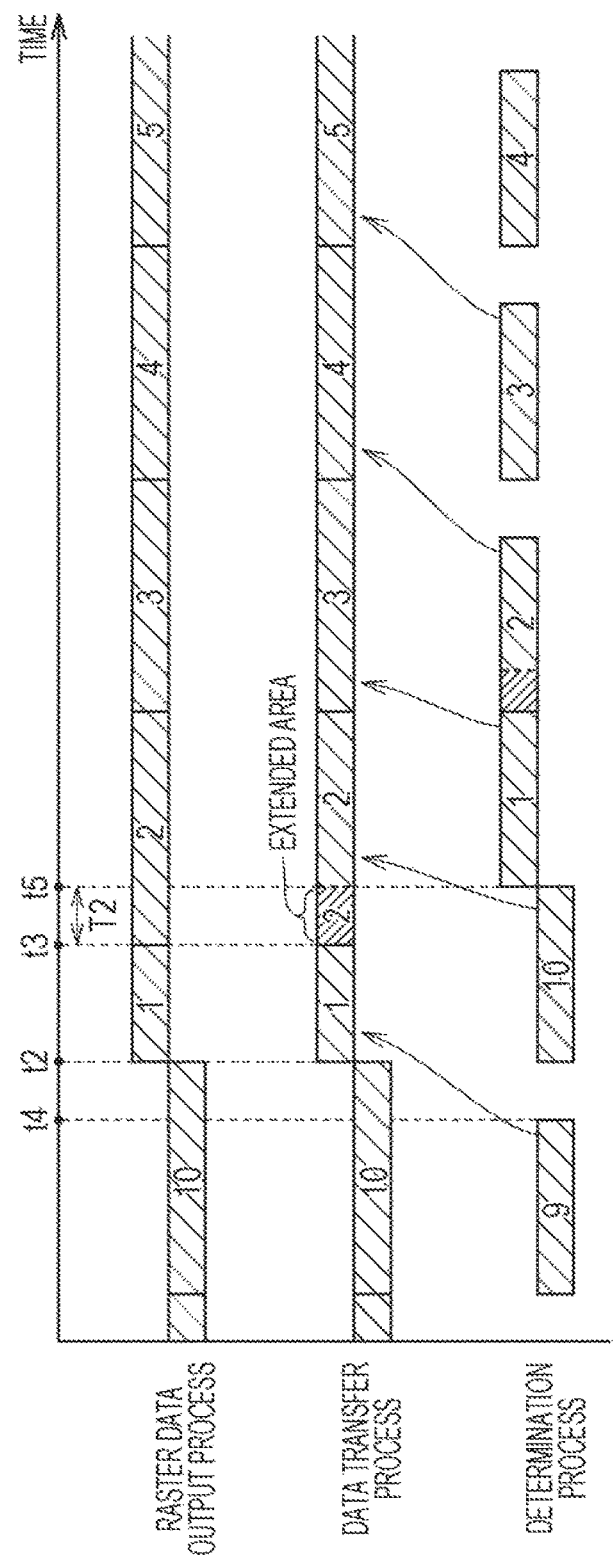
FIG. 13 is a diagram illustrating a time schedule of the raster data output process, the data transfer process, and the determination process for a case where the determination speed has been changed to the high speed value in Example 6.

FIG. 13 is a diagram illustrating a time schedule of the raster data output process, the data transfer process, and the determination process for a case where the determination speed has been changed to the high speed value in Example 6.

In Example 6, it is determined in step S2 that the time schedule indicated by the schedule information satisfies both of the first and second conditions. Hence, in step S3, the speed control unit 64 changes the determination speed to four-thirds of the data transfer speed. Moreover, in step S4, it is determined that the schedule information satisfies the second condition. Hence, in step S6, the buffer control unit 65 extends the determination-purpose buffer 52.

In Example 6, the schedule information satisfies only the second condition. Accordingly, the buffer control unit 65 calculates only the image determination delay time T2 as the delay time. The buffer control unit 65 then extends the determination-purpose buffer 52 by a storable capacity (equal to a quarter band) by the data transferer 51 for the time T2, in accordance with Equation (1) above.

As illustrated in FIG. 13, at timing t2 when the output of raster data of the second page starts, the ninth determination process for the first page has been completed. Hence, the data transferer 51 stores the first image determination-purpose data (a half band) of the second page and the top end-specific blank data (a half band) in the normal area of the determination-purpose buffer 52.

At timing t3 when the data transfer process for the first image determination-purpose data of the second page is completed, the entire normal area of the determination-purpose buffer 52 is filled with the data for which the determination process has not yet been completed. Hence, the data transferer 51 stores part (a quarter band) of the second image determination-purpose data of the second page in the extended area of the determination-purpose buffer 52 from timing t3 to timing t5 when the tenth determination process for the first page is completed. Consequently, the entire extended area (equal to a quarter band) is filled with the data.

Next, at timing t5, the determination process for the tenth image determination-purpose data of the first page is completed. As a result, one band's worth of space is freed up in the normal area of the determination-purpose buffer 52. Hence, the data transferer 51 stores the remainder (three-fourths of a band) of the second image determination-purpose data of the second page in the normal area of the determination-purpose buffer 52 from timing t5.

After timing t5 onward, the data transferer 51 does not need to store the blank data (the top end-specific blank data or shortage-specific blank data). Hence, the data transfer process and the determination process are performed in parallel on each set of image determination-purpose data to gradually increase the free space in the extended area on the basis of the difference between the determination speed value and the data transfer speed value. Hence, the data transferer 51 can store image determination-purpose data in the determination-purpose buffer 52 without problems.

In this manner, in Example 6, the buffer control unit 65 extends the determination-purpose buffer 52 by a quarter band; accordingly, data loss can be prevented. Hence, the inter-paper time can be set at zero, and the speed of parallel processing of the rasterization process and the determination process can be increased.

In Example 6, the second image determination-purpose data of the second page is stored in the extended area of the determination-purpose buffer 52.

EXAMPLE 7

Example 7 is an example of a case where the inter-paper time is zero, and the first number of lines is set at 13/20ths of the number of lines of one band.

Figure 14:
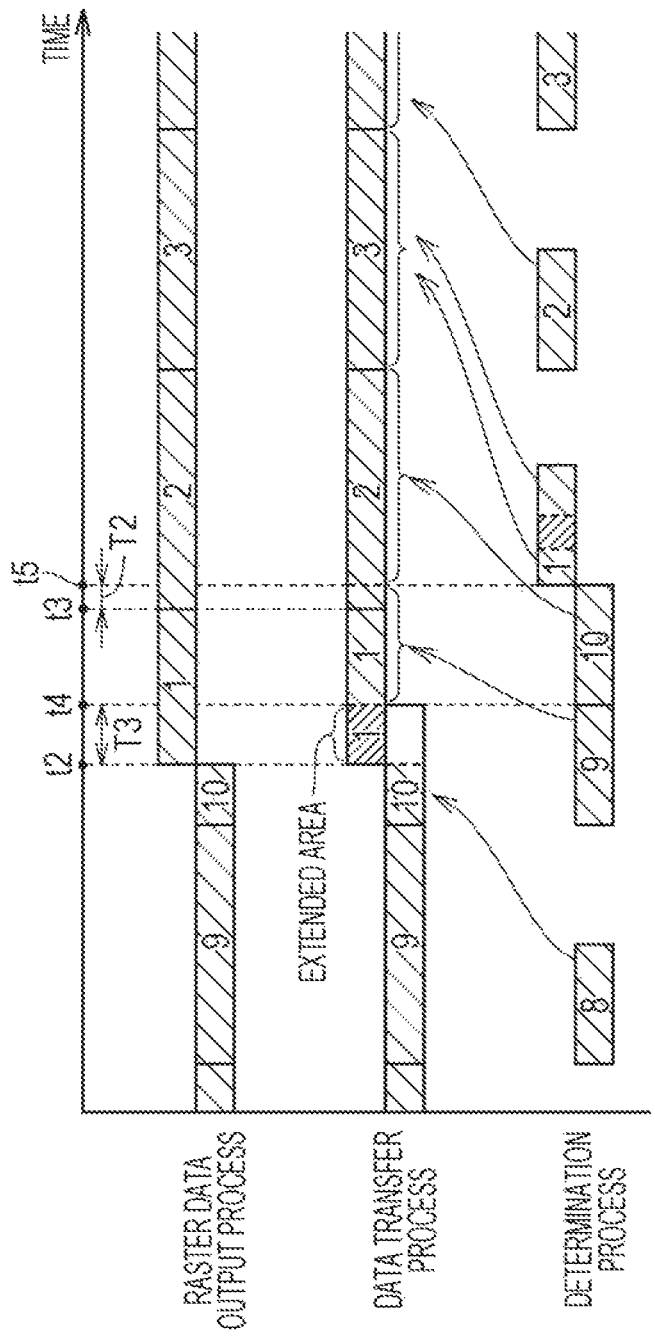
FIG. 14 is a diagram illustrating a time schedule of the raster data output process, the data transfer process, and the determination process for a case where the determination speed has been changed to the high speed value in Example 7.

FIG. 14 is a diagram illustrating a time schedule of the raster data output process, the data transfer process, and the determination process for a case where the determination speed has been changed to the high speed value in Example 7.

In Example 7, it is determined in steps S2 and S4 that the time schedule indicated by the schedule information satisfies both of the first and second conditions, as in Example 4. Hence, in step S3, the speed control unit 64 changes the determination speed to the double of the data transfer speed. Moreover, in step S6, the buffer control unit 65 extends the determination-purpose buffer 52.

In Example 7, the storage delay time T3 is longer than the image determination delay time T2. Hence, the buffer control unit 65 extends the determination-purpose buffer 52 by a storable capacity (equal to a quarter band) by the data transferer 51 for the time T3, in accordance with Equation (1) above.

As illustrated in FIG. 14, the ninth and tenth image determination-purpose data and the shortage-specific blank data of the first page, for which the determination process has not yet been completed, are stored in the entire normal area of the determination-propose buffer 52 from timing t2 to timing t4. Hence, the data transferer 51 stores part (a quarter band) of the first image determination-purpose data of the second page in the extended area of the determination-purpose buffer 52. Consequently, the entire extended area (equal to a quarter band) is filled with the data.

At timing t4, the ninth determination process for the first page is completed. As a result, one band's worth of space is freed up in the normal area of the determination-purpose buffer 52. Hence, the data transferer 51 stores the remainder (two-fifths of a band) of the first image determination-purpose data of the second page, the top end-specific blank data (seven-twentieth of a band), and part (one-tenth of a band) of the second image determination-purpose data of the second page in the normal area of the determination-purpose buffer 52 from timing t4.

Next, at timing t5, the determination process for the tenth image determination-purpose data of the first page is completed. As a result, one band's worth of space is freed up in the normal area of the determination-purpose buffer 52. Hence, the data transferer 51 stores the remainder (nine-tenths of a band) of the second image determination-purpose data of the second page in the normal area of the determination-purpose buffer 52 from timing t5.

After timing t5 onward, the data transferer 51 does not need to store the blank data (the top end-specific blank data or shortage-specific blank data). Hence, the data transfer process and the determination process are performed in parallel on each set of image determination-purpose data to gradually increase the free space in the extended area on the basis of the difference between the determination speed value and the data transfer speed value. Hence, the data transferer 51 can store image determination-purpose data in the determination-purpose buffer 52 without problems.

In this manner, in Example 7, the buffer control unit 65 extends the determination-purpose buffer 52 by a quarter band; accordingly, data loss can be prevented. Hence, the inter-paper time can be set at zero, and the speed of parallel processing of the rasterization process and the determination process can be increased.

In Example 7, the first image determination-purpose data of the second page is stored in the extended area of the determination-purpose buffer 52.

EXAMPLE 8

Example 8 is an example of a case where the inter-paper time is zero, and the high speed value of the determination speed is ten-ninths of the data transfer speed.

Figure 15:
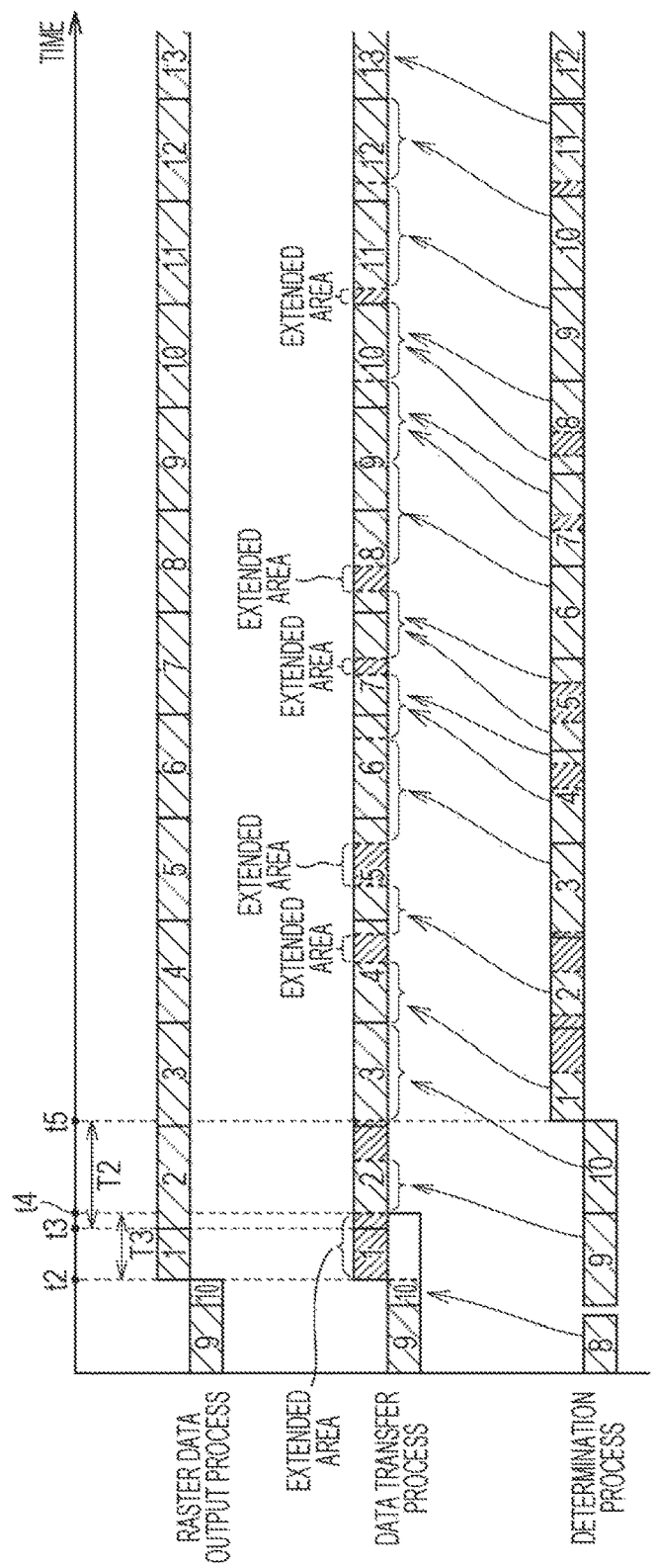
FIG. 15 is a diagram illustrating a time schedule of the raster data output process, the data transfer process, and the determination process for a case where the determination speed has been changed to the high speed value in Example 8.

FIG. 15 is a diagram illustrating a time schedule of the raster data output process, the data transfer process, and the determination process for a case where the determination speed has been changed to the high speed value in Example 8.

In Example 8, it is determined in steps S2 and S4 that the time schedule indicated by the schedule information satisfies both of the first and second conditions. Hence, in step S3, the speed control unit 64 changes the determination speed to ten-ninths of the data transfer speed. Moreover, in step S6, the buffer control unit 65 extends the determination-purpose buffer 52.

In Example 8, the image determination delay time T2 is longer than the storage delay time T3. Hence, the buffer control unit 65 extends the determination-purpose buffer 52 by a storable capacity (equal to 21/20ths of a band) by the data transferer 51 for the time T2, in accordance with Equation (1) above.

As illustrated in FIG. 15, the ninth and tenth image determination-purpose data and the shortage-specific blank data of the first page, for which the determination process has not yet been completed, are stored in the entire normal area of the determination-purpose buffer 52 from timing t2 to timing t4. Hence, the data transferer 51 stores the first image determination-propose data (a half band) of the second page and part (three-twentieth of a band) of the second image determination-purpose data of the second page in the extended area of the determination-purpose buffer 52.

At timing t4, the ninth determination process for the first page is completed. As a result, one band's worth of space is freed up in the normal area of the determination-purpose buffer 52. Hence, the data transferer 51 stores the top end-specific blank data (a half band), part (a half band) of the second image determination-purpose data of the second page in the normal area of the determination-purpose buffer 52 from timing t4.

At timing t7, the entire normal area of the determination-purpose buffer 52 is filled with the data for Which the determination process has not yet been completed. Hence, the data transferer 51 stores the remainder (seven-twentieth of a band) of the second image determination-purpose data of the second page and part (one-twentieth of a band) of the third image determination-purpose data of the second page in the extended area of the determination-purpose buffer 52 from timing t7 to timing t5 when the tenth determination process for the first page is completed. Consequently, the entire extended area (equal to 21/20ths of a band) is filled with the data.

Next, at timing t5, the determination process for the tenth image determination-purpose data of the first page is completed. As a result, one band's worth of space is freed up in the normal area of the determination-purpose buffer 52. Hence, the data transferer 51 stores the remainder (19/20ths of a band) of the third image determination-purpose data of the second page and part (one-twentieth of a band) of the fourth image determination-purpose data of the second page in the normal area of the determination-purpose buffer 52 from timing t5.

After timing t5 onward, the data transferer 51 does not need to store the blank data (the top end-specific blank data or shortage-specific blank data). Hence, the data transfer process and the determination process are performed in parallel on each set of image determination-purpose data to gradually increase the free space in the extended area on the basis of the determination speed value and the data transfer speed value. Hence, the data transferer 51 stores image determination-purpose data in the determination-purpose buffer 52 without problems.

In this manner, in Example 8, the buffer control unit 65 extends the determination-purpose buffer 52 by 21/20ths of a band; accordingly, data loss can be prevented. Hence, the inter-paper time can be set at zero, and the speed of parallel processing of the rasterization process and the determination process can be increased.

In Example 8, the first to fifth, seventh, eighth, and eleventh image determination-purpose data of the second page are stored in the extended area of the determination-purpose buffer 52.

EXAMPLE 9

Example 9 is an example of a case where an image presented by print data is three pages, the number of sets of image determination-purpose data M of each page is six, and the high speed value of the determination speed is ten-ninths of the data transfer speed.

Figure 16:
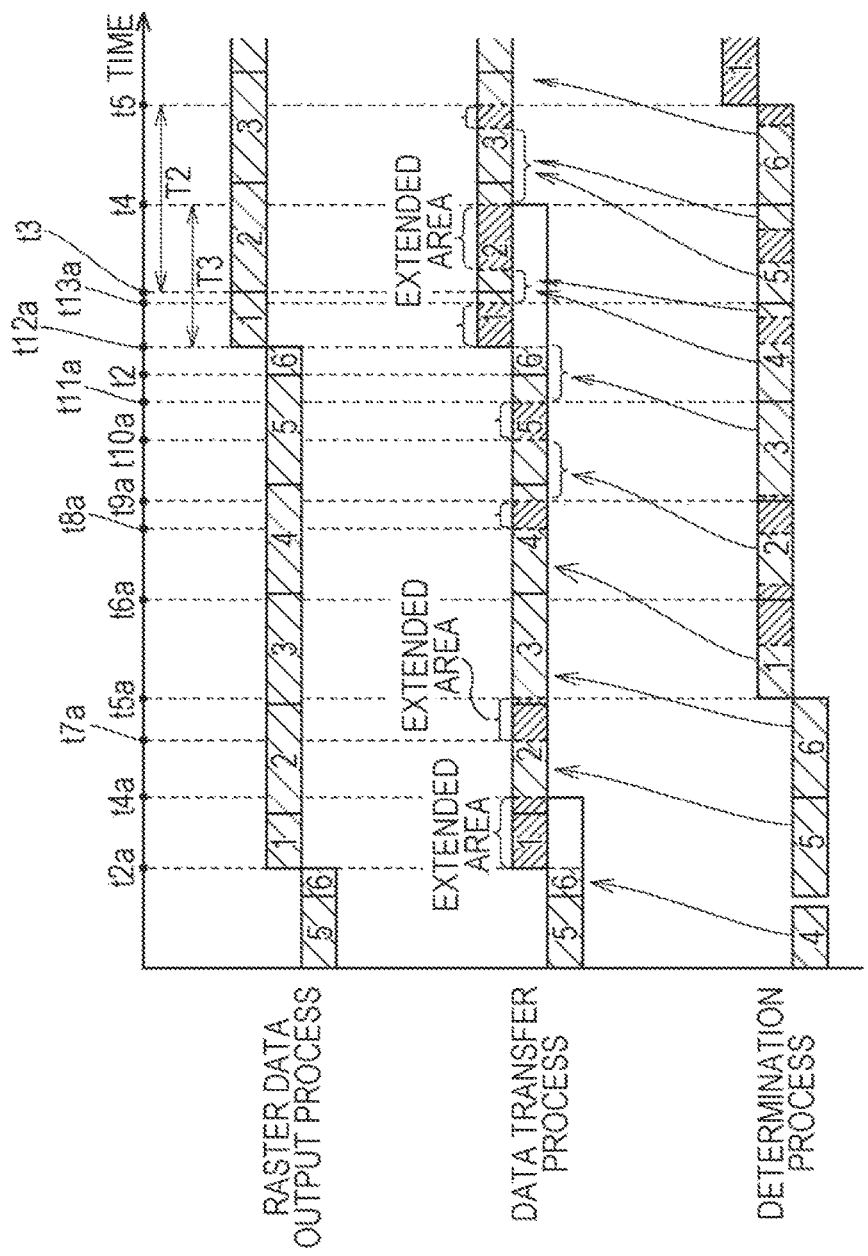
FIG. 16 is a diagram illustrating a time schedule of the raster data output process, the data transfer process, and the determination process for a case where the determination speed has been changed to the high speed value in Example 9.

FIG. 16 is a diagram illustrating a time schedule of the raster data output process, the data transfer process, and the determination process for a case where the determination speed has been changed to the high speed value in Example 9.

In Example 9, it is determined in steps S2 and S4 that the time schedule indicated by the schedule information satisfies both of the first and second conditions. Hence, in step S3, the speed control unit 64 changes the determination speed to ten-ninths of the data transfer speed. Moreover, in step S6, the buffer control unit 65 extends the determination-purpose buffer 52.

In Example 9, the image determination delay time T2 of the third page is the longest. Hence, the buffer control unit 65 extends the determination-purpose buffer 52 by a storable capacity (equal to 17/10ths of a band) by the data transferer 51 for the time T2, in accordance with Equation (1) above.

As illustrated in FIG. 16, the fifth and sixth image determination-purpose data and the shortage-specific blank data of the first page, for which the determination process has not yet been completed, are stored in the entire normal area of the determination-purpose buffer 52 from timing t2a when the raster data output process for the second page starts to timing t4a when the fifth determination process for the first page is completed. Hence, the data transferer 51 stores the first image determination-purpose data (a half band) of the second page and part (three-twentieth of a band) of the second image determination-purpose data of the second page in the extended area of the determination-purpose buffer 52.

Next, at timing t4a, one band's worth of space is freed up in the normal area of the determination-purpose buffer 52. Hence, the data transferer 51 stores the top end specific blank data (a half band) and part (a half band) of the second image determination-purpose data of the second page in the normal area of the determination-purpose buffer 52 from timing t4a.

At timing t7a when the data transfer process for part (a half band) of the second image determination-purpose data of the second page is completed, the entire normal area of the determination-purpose buffer 52 is filled with the data for which the determination process has not yet been completed. Hence, the data transferer 51 stores the remainder (seven-twentieths of a band) of the second image determination-purpose data of the second page and part (one-twentieth of a band) of the third image determination-purpose data of the second page in the extended area of the determination-purpose buffer 52 from timing t7a to timing t5a when the tenth determination-purpose process for the first page is completed.

Next, at timing t5a when the determination process for the first page is completed, the tenth determination process for the first page is completed. As a result, one band's worth of space is freed up in the normal area of the determination-purpose buffer 52. Hence, the data transferer 51 stores the remainder (19/20ths of a band) of the third image determination-purpose data of the second page and part (one-twentieth of a band) of the fourth image determination-purpose data of the second page in the normal area of the determination-purpose buffer 52 from timing t5a.

Moreover, at timing t6a when the data transferer 51 is performing the third data transfer process for the second page, the first determination process for the second page is completed. As a result, (a half band's worth of space in) the normal area and (a half band's worth of space in) the extended area are freed up on the determination-purpose buffer 52.

Therefore, the data transferer 51 stores part (a half band) of the fourth image determination-purpose data of the second page in the normal area of the determination-purpose buffer 52.

At timing t8a when the data transfer process for 11/20ths' worth of the fourth image determination-purpose data of the second page is completed, the entire normal area is filled with the data. Hence, the data transferer 51 stores part (three-tenths of a band) of the fourth image determination-purpose data of the second page in the extended area of the determination-purpose buffer 52 from timing t8a to timing t9a when the second determination process for the second page is completed.

Next, at timing t9a, the second determination process for the second page is completed. As a result, a half band's worth of space in the normal area and a half band's worth of space in the extended area are freed up on the determination-purpose buffer 52. Hence, the data transferer 51 stores the remainder (three-twentieths of a band) of the fourth image determination-purpose data of the second page and part (seven-twentieths of a band) of the fifth image determination-purpose data of the second page are stored in the normal area of the determination-purpose buffer 52 from timing t9a.

At timing t10a when the data transfer process for part (three-tenths of a band) of the fifth image determination-purpose data of the second page is completed, the entire normal area is filled with the data. Hence, the data transferer 51 stores part (two-fifths of a band) of the fifth image determination-purpose data of the second page in the extended area of the determination-purpose buffer 52 from timing t10a to timing t11a when the third determination process for the second page is completed.

Next, at timing t11a, the third determination process for the second page is completed. As a result, 19/20ths of a band's worth of space in the normal area and one-twentieth of a band's worth of space in the extended area are freed up on the determination-purpose buffer 52. Hence, the data transferer 51 stores the remainder (a quarter band) of the fifth image determination-purpose data of the second page in the normal area of the determination-purpose buffer 52 from timing t11a.

At timing t12a when the fifth data transfer process for the second page is completed, seven-tenths of a band's worth of space in the normal area and one band's worth of space in the extended area are freed up on the determination-purpose buffer 52.

Hence, the data transferer 51 stores the sixth image determination-purpose data (a quarter band) of the second page, the shortage-specific blank data (three-fourths of a band) of the second page, and part (two-fifths of a band) of the first image determination-purpose data of the third page in (seven-tenths of a band's worth of space in) the normal area and (seven-tenths of a band's worth of space in) the extended area of the determination-purpose buffer 52 from timing t12a to timing t13a when the fourth determination process for the second page is completed.

Next, when the fourth determination process for the second page is completed at timing t13a, seven-tenths of a band's worth of space in the normal area and three-tenths of a band's worth of space in the extended area are newly freed up on the determination-purpose buffer 52. At this point in time, the total free space is seven-tenths of a band's worth of space in the normal area and three-fifths of a band's worth of space in the extended area.

Hence, the data transferer 51 stores the remainder (one-tenth of a band) of the first image determination-purpose data of the third page, part (two-fifths of a band) of the top end-specific blank data of the third page, and part (four-fifths of a band) of the second image determination-purpose data of the third page in the entire free space from timing t13a to timing t4 when the fifth determination process for the second page is completed.

Next, when the fifth determination process for the second page is completed at timing t4, three-fifths of a band's worth of space in the normal area and two-fifths of a band's worth of space in the extended area are freed up on the determination-purpose buffer 52.

Hence, the data transferer 51 stores the remainder (one-tenth of a band) of the top end-specific blank data of the third page, the remainder (one-fifth of a band) of the second image determination-purpose data of the third page, and part (seven-tenths of a band) of the third image determination-purpose data of the third page in the free space from timing t4 to timing t5 when the determination process for the sixth image determination-purpose data of the second page is completed. Consequently, the entire extended area is filled with the data.

After timing t5 onward, the data transferer 51 does not need to store the blank data (the top end-specific blank data or shortage-specific blank data). Hence, the data transfer process and the determination process are performed in parallel on each set of image determination-purpose data to gradually increase the free space in the extended area on the basis of the difference between the determination speed value and the data transfer speed value. Hence, the data transferer 51 can store image determination-purpose data in the determination-purpose buffer 52 without problems.

In this manner, if print data contains three or more pages, the buffer control unit 65 extends the determination-purpose buffer 52 by a storable capacity by the data transferer 51 for the longest time of the storage delay times and the image determination delay times of the pages. Consequently, data loss can be prevented. Hence, the inter-paper time can be set at zero, and the speed of parallel processing of the raster-ization process and the determination process can be increased.

Modification 1

In the above description, the buffer control unit 65 determines the buffer's capacity to be extended on the basis of the longest time of the storage delay time and the image determination delay time of each page if print data contains three or more pages. However, the buffer control unit 65 may determine the buffer's capacity to be extended on a page by page basis.

In this case, the buffer control unit 65 calculates the storage delay time T3 and the image determination delay time T2 for each of the second and subsequent pages. The buffer control unit 65 is simply required to determine, for each page, the buffer's capacity to be extended on the basis of the storage delay time T3 or image determination delay time T2 calculated for the page, whichever is longer.

While the data transferer 51 is performing the data transfer process on image determination-purpose data of the n-th page (n an integer equal to or greater than two), the buffer control unit 65 extends the determination-purpose buffer 52 by a capacity determined for the n-th page.

Consequently, the buffer control unit 65 can extend the determination-purpose buffer 52 by an optimum capacity for each page. As a result, the MFP 1 can reduce the amount (reduction amount) of a memory area for another process, the memory area being reduced to extend the determination-purpose buffer 52.

Modification 2

As described above in examples 3 to 8, image determination-purpose data of a predetermined number and later within a page is not stored in the extended area of the determination-purpose buffer 52. Hence, the buffer control unit 65 may release the extended area of the determination-purpose buffer 52 at a timing when the extended area becomes unnecessary and return to the normal area alone.

It is assumed here that the time required by the data transferer 51 to store one band's worth of data in the determination-purpose buffer 52 is the one band storage time, and the time required by the image determination unit 53 to perform the determination process on one band's worth of data is the one band determination time.

The determination speed value is larger than the data transfer speed value. Accordingly, whenever one band's worth of image determination-purpose data is processed, the time difference between the timing when the data storage process for each set of image determination-purpose data is completed and the timing when the determination process for the image determination-purpose data starts is reduced by the difference between the one band storage time and the one band determination time. The time difference of the first image determination-purpose data of a certain page is the image determination delay time T2 of the page.

At and after the timing when the timing when the data storage process for a certain set of image determination-purpose data is completed agrees with the timing when the determination process starts, the data transferer 51 does not need to store data in the extended area of the determination-purpose buffer 52. In other words, the extended area becomes unnecessary.

Hence, the buffer control unit 65 calculates the number of sets of image determination-purpose data until the extended area becomes unnecessary (hereinafter referred to as the resolution number) on the basis of the information acquired by the information acquisition unit 61, in accordance with Equation (2) below:

The resolution number the image determination delay time $T2/\{$(the number of lines of one band/the data transfer speed)−(the number of lines of one band/the determination speed)$\}$        Equation (2)

In Equation (2), (the number of lines of one band/the data transfer speed) indicates the one band storage time. (The number of lines of one band/the determination speed) indicates the one band determination time.

In terms of the last page, the buffer control unit 65 is simply required to release the extended area of the determination-purpose buffer 52 and return to the normal area alone after the timing when the determination process of the resolution number calculated by Equation (2) is completed.

Alternatively, in a case of Modification 1 above being applied, the buffer control unit 65 is simply required. on a page basis to release the extended area of the determination-purpose buffer 52 and return to the normal area alone after the timing When the determination process of the resolution number calculated by Equation (2) is completed. The buffer control unit 65 is then required to extend the determination-purpose buffer 52 again at the timing when the next page is started being processed.

Consequently, the buffer control unit 65 can extend the determination-purpose buffer 52 only during a necessary period. As a result, the MFP 1 can restrict the limited period of the memory area allocated to another process to a minimum to extend the determination-purpose buffer 52.

Modification 3

In the above description, if the time schedule indicated by the schedule information is determined to satisfy at least one of the first and second conditions, it is assumed that the speed control unit 64 changes the determination speed value of the image determination unit 53 from the default value to the high speed value.

However, if the performance of the processor allocated to the image determination unit 53 is relatively high, the high speed value may be preset as the default value of the determination speed value of the image determination unit 53. In other words, the image determination unit 53 can always execute the determination process at the determination speed of the high speed value (for example, the double of the data transfer speed). In this case, the MFP 1 may not include the speed control unit 64.

Modification 4

The above first and second conditions are premised on the output of raster data corresponding to a plurality of pages. Hence, only if the decompression unit 44 continuously outputs a plurality of sets of raster data, that is, only if print data contains data of a plurality of pages, the speed-up processing unit 60 may operate.

Modification 5

In the above description, the normal area of the determination-purpose buffer 52 is premised on a capacity equal to two bands. However, the capacity of the normal area of the determination-purpose buffer 52 may exceed two bands.

In this case, the information acquisition unit 61 acquires the capacity of the normal area of the determination-purpose buffer 52. The capacity is preset by a designer of the MFP 1, and is stored in advance in the ROM 22.

The speed-up determination unit 63 is simply required to determine whether or not the time schedule satisfies the overflow condition, considering the capacity of the normal area of the determination-purpose buffer 52. It is assumed, for example, that the capacity of the normal area of the determination-purpose buffer 52 is (two bands+$\alpha$), and that the time required for the data transfer process for image determination-purpose data equal to the capacity $\alpha$ is T$\alpha$. At this point in time, if the time schedule satisfies at least one of the following third and fourth conditions, the speed-up determination unit 63 is simply required to determine that the time schedule satisfies the overflow condition.

Third condition: the timing when the time T$\alpha$ has passed since timing t2 when the decompression unit 44 starts the output process of target raster data is before timing t4 when the image determination unit 53 completes the second from the last determination process for previous raster data.

Fourth condition: the timing when the time T$\alpha$ has passed since timing t3 when the data transferer 51 completes the first data transfer process for target raster data is before timing t5 when the image determination unit 53 completes the last determination process for previous raster data.

Second Embodiment

An MFP according to a second embodiment of the present invention is described below. The hardware configuration of the MFP according to the second embodiment is the same as the configuration of the first embodiment illustrated in FIG. 2; accordingly, its description is omitted.

Figure 17:
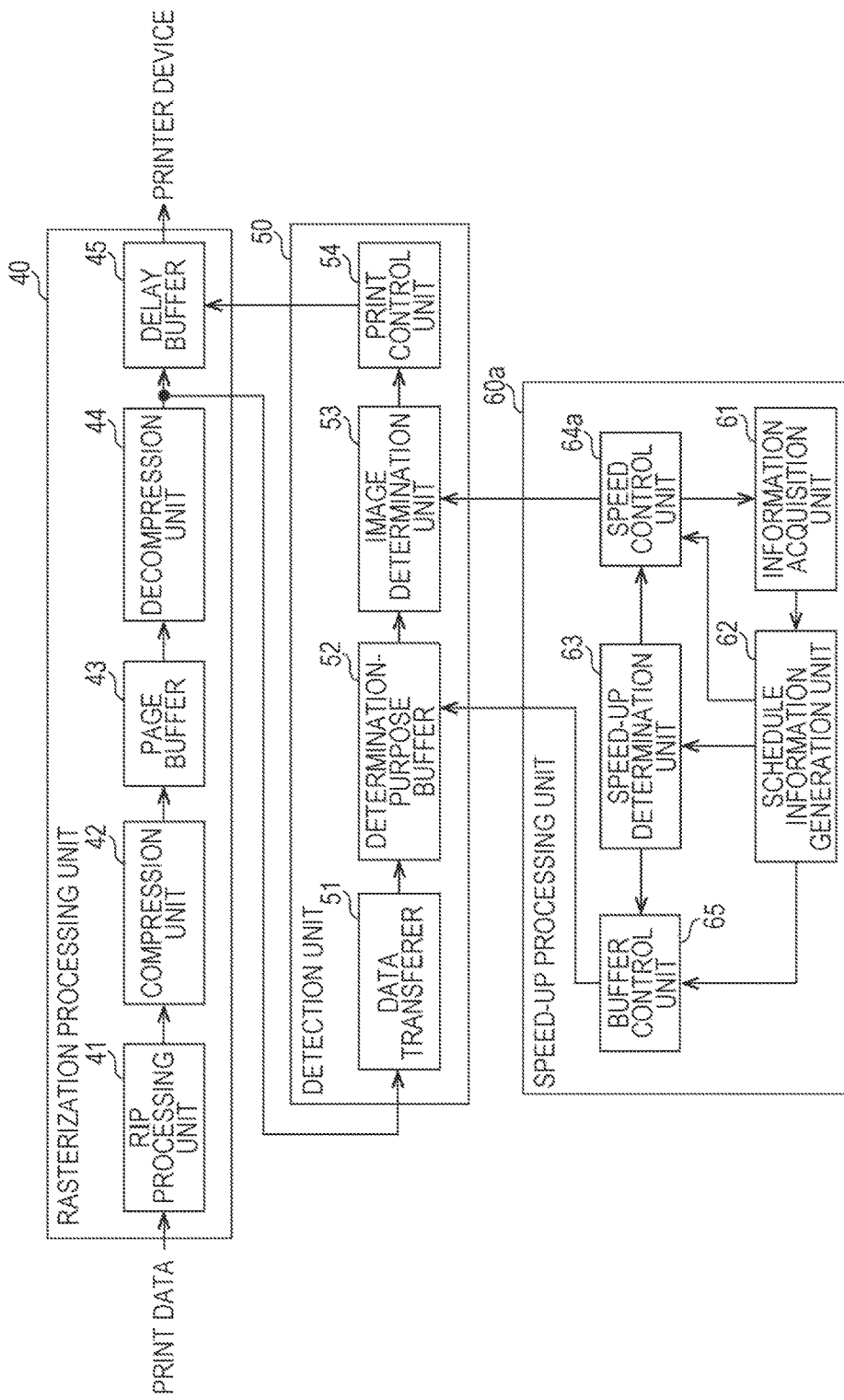
FIG. 17 is a diagram illustrating the functional configuration of an MFP according to a second embodiment of the present invention.

FIG. 17 is a diagram illustrating the functional configuration of the MFP according to the second embodiment. As illustrated in FIG. 17, the MFP according to the second embodiment is different from the MFP 1 of the first embodiment in the respect of including a speed-up processing unit 60$a$ instead of the speed-up processing unit 60.

The speed-up processing unit 60$a$ is different from the speed-up processing unit 60 only in the respect of including a speed control unit 64$a$ instead of the speed control unit 64.

The speed control unit 64$a$ controls the determination speed of the image determination unit 53, and outputs the currently set determination speed value to the information acquisition unit 61.

Specifically, the speed control unit 64a sets the determination speed value at a default value at the start of a new print job. The default value is preset according to the performance of a processor configuring the image determination unit 53. However, the default value is set at a higher value (for example, ten-ninths of the data transfer speed) than the data transfer speed value the raster data output speed value).

Moreover, the speed control unit 64a calculates the number of sets of image determination-purpose data until the extended area becomes unnecessary (the resolution number) on the basis of the schedule information generated by the schedule information generation unit 62, in accordance with Equation (2) below. Equation (2) is the same as the equation illustrated in Modification 2 of the first embodiment.

$$\text{The resolution number} = \frac{\text{the image determination delay time } T2}{\{(\text{the number of lines of one band/the data transfer speed}) - (\text{the number of lines of one band/the determination speed})\}} \quad \text{Equation (2)}$$

The speed control unit 64a compares the calculated resolution number and the number of sets of image determination-purpose data M included in each page. If the calculated resolution number is larger than the number M, the speed control unit 64a calculates a required determination speed in accordance with Equation (3) below:

$$\text{The required determination speed} = \frac{\text{the number of lines of one band}}{\{(\text{the number of lines of one band/the data transfer speed}) - T2/M\}} \quad \text{Equation (3)}$$

The speed control unit 64a controls the determination speed of the image determination unit 53 to equal to or greater than the calculated required determination speed.

<Flow of Processes in the MFP>

Figure 18:
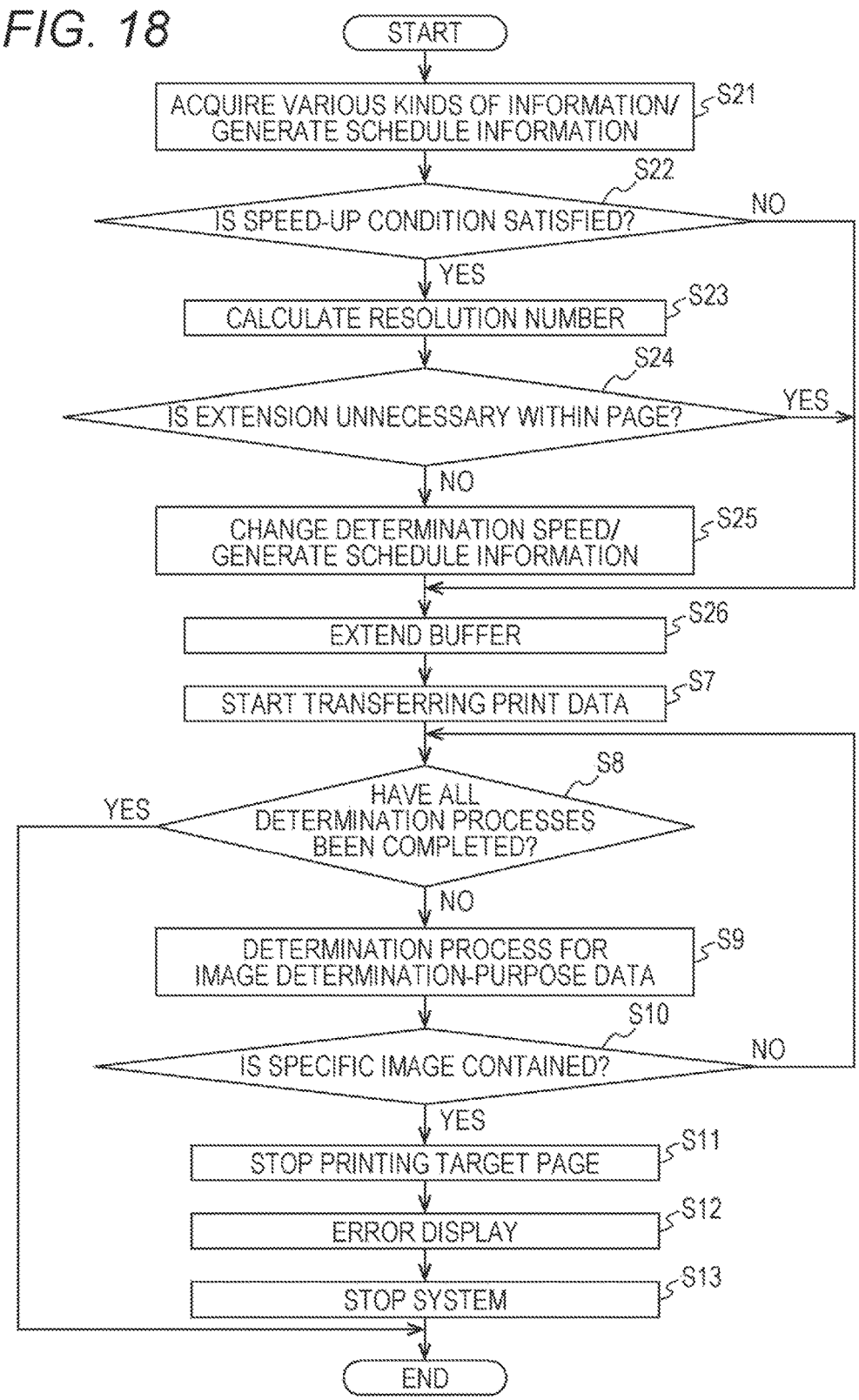
FIG. 18 is a flowchart illustrating the flow of processes in the MFP according to the second embodiment.

FIG. 18 is a flowchart illustrating the flow of processes in the MFP according to the second embodiment. As illustrated in FIG. 18, when the MIT has accepted an instruction to start a print job, the information acquisition unit 61 acquires various kinds of information (step S21). At this point in time, the speed control unit 64a sets the determination speed value of the image determination unit 53 at the default value.

In step S21, the speed control unit 64a sets the determination speed value of the image determination unit 53 at the default value, and transmits the default value to the information acquisition unit 61. The schedule information generation unit 62 then generates schedule information on the basis of the information (including the determination speed indicating the default value) acquired by the information acquisition unit 61.

Next, the speed-up determination unit 63 determines whether or not a time schedule indicated by the schedule information satisfies at least one of the first and second conditions (step S22).

If the time schedule satisfies at least one of the first and second conditions (YES in step S22), the speed-up determination unit 63 outputs a speed-up instruction to the speed control unit 64a.

The speed control unit 64a, which has received the speed-up instruction, calculates the resolution number by Equation (2) above on the basis of the schedule information (step S23).

Next, the speed control unit 64a determines whether or not the extended area becomes unnecessary within a page (step 524). Specifically, the speed control unit 64a compares the resolution number calculated in step S23 and the number of sets of image determination-purpose data M included in each page. If the resolution number is equal to or less than the number M, then the speed control unit 64a determines that the extended area becomes unnecessary within the page.

If the extended area does not become unnecessary within the page (NO in step S24), the speed control unit 64a calculates the required determination speed on the basis of Equation (3) above. The speed control unit 64a then controls the determination speed of the image determination unit 53 to equal to or greater than the calculated required determination speed (step S25).

In step S25, the information acquisition unit 61 acquires the value of the changed determination speed from the speed control unit 64. The schedule information generation unit 62 then regenerates schedule information on the basis of the information acquired by the information acquisition unit 61.

Next, the buffer control unit 65 calculates the image determination delay time T2 and the storage delay time T3 on the basis of the latest schedule information. In other words, if performing step S27 after step S25, the buffer control unit 65 calculates delay time on the basis of the schedule information that has been generated on the basis of the changed determination speed. Moreover, if YES in step S24, the buffer control unit 65 calculates delay time on the basis of the schedule information that has been generated on the basis of the determination speed of the default value. The buffer control unit 65 then calculates a capacity to be extended, by Equation (1) above, on the basis of the calculated delay time, and extends the determination-purpose buffer 52 by the calculated capacity (step S26).

If, for example, raster data similar to the one in Example 9 of the first embodiment illustrated in FIG. 16 is outputted, and the default value of the determination speed is ten-ninths of the data transfer speed, the speed control unit 64a determines in step 524 that the delay time cannot be resolved within the page. In step S25, the speed control unit 64a then changes the determination speed of the image determination unit 53 to a speed that allows the delay time to be resolved within the page. Furthermore, the buffer control unit 65 determines the buffer's capacity to be extended, on the basis of the changed determination speed.

Figure 19:
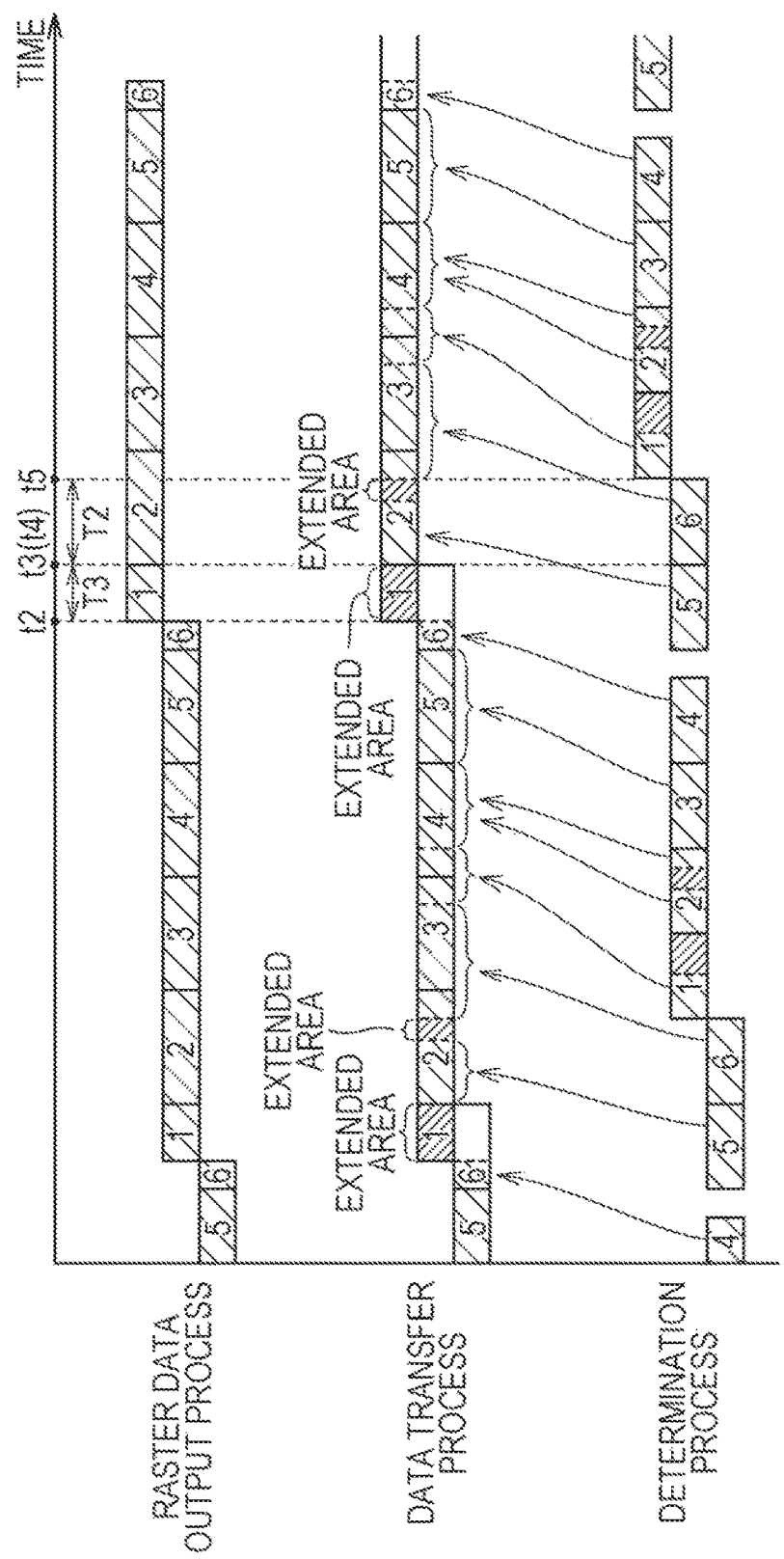
FIG. 19 is a diagram illustrating a time schedule of the raster data output process, the data transfer process, and the determination process after a change to a determination speed that eliminates the necessity of an extended area within a page.

FIG. 19 is a diagram illustrating a time schedule of the raster data output process, the data transfer process, and the determination process after a change to a determination speed that eliminates the necessity of the extended area within a page (here, four-thirds of the data transfer speed).

As illustrated in FIG. 19, the image determination delay time of each page is resolved by processing image determination data within the image Hence, the delay time is not accumulated every page. Therefore, the buffer control unit 65 can reduce the capacity of the extended area of the determination-purpose buffer 52. As a result, the MFP can reduce the amount (reduction amount) of the memory area for another process, the memory area being reduced to extend the determination-purpose buffer 52.

In the above first and second embodiments, a program may be provided which causes the MFP 1 to execute the above-mentioned operations (including steps S1 to S6 (especially, steps S3 to S6) illustrated in FIG. 7, or steps S21 to S26 illustrated in FIG. 18). Such a program can also be provided as a program product by being recorded in a computer readable recording medium such as a flexible disk, a compact disk-read only memory (CD-ROM), a ROM, a RAM, or a memory card, which is supplied with a computer of the MFP 1. Alternatively, the program can also be provided by being recorded in a recording medium such as a hard disk built in the computer. Moreover, the program can also be provided by being downloaded via a network.

The program may call necessary modules in a predetermined array from program modules provided as part of an operating system (OS) of the computer at a predetermined timing to execute processes. In this case, the program itself does not include the above modules and executes the processes in cooperation with the OS.

Moreover, the program according to the first and second embodiments may be provided, incorporated in part of another program. Also in that case, the program itself does not include modules included in the other program, and executes the processes in cooperation with the other program. Such a program incorporated in another program can also be included in the program according to the first and second embodiments.

The program product provided is executed by being installed in a program storage unit such as a hard disk. The program product includes the program itself and a recording medium where the program has been recorded.

Although embodiments of the present invention have been described and illustrated in detail, it is clearly understood that the same is by way of illustration and example only and not limitation, the scope of the present invention should be interpreted by terms of the appended claims. The scope of the present invention is intended to include meanings equivalent to the claims and all modifications within the scope.

What is claimed is:

1. An image processing apparatus comprising:
   a raster data output that executes a first process of outputting raster data obtained by developing print data;
   a data transferer that generates image determination-purpose data on the basis of divided data obtained by dividing the raster data from the raster data output, and executes a second process of storing the generated image determination-purpose data in a buffer; and
   a hardware processor that:
      executes a third process of determining whether or not an image presented by the image determination-purpose data stored in the buffer contains a specific image,
      generates schedule information indicating a time schedule of the first, second, and third processes,
      determines each set of raster data on whether or not the time schedule indicated by the schedule information satisfies an overflow condition, and
      upon having determined that the time schedule satisfies the overflow condition, performs control in such a manner as to extend the buffer,
   wherein the overflow condition is a condition that at least part of a period of the second process overlaps with at least part of a period during which the image determination-purpose data for which the third process has not been completed occupies an entire area of the buffer.

2. The image processing apparatus according to claim 1, wherein
   upon the time schedule indicated by the schedule information satisfying at least one of a first condition and a second condition, the hardware processor determines each set of raster data to satisfy the overflow condition,
   the first condition is a condition that a first timing when the first process for target raster data starts is before a second timing when the third process for the second from the last image determination-purpose data of previous rater data is completed, and
   the second condition is a condition that a third timing when the second process for the first image determination-purpose data of target raster data is completed is before a fourth timing when the third process for the last image determination-purpose data of previous raster data is completed.

3. The image processing apparatus according to claim 2, wherein the hardware processor
   generates, as the schedule information, information indicating time from a reference timing being a timing when the raster data output starts the first process for the first raster data to each of the first, second, third, and fourth timings, and
   on the basis of the schedule information, upon the time from the reference timing to the first timing being shorter than the time from the reference timing to the second timing, determines that the time schedule satisfies the first condition, and upon the time from the reference timing to the third timing being shorter than the time from the reference timing to the fourth timing, determines that the time schedule satisfies the second condition.

4. The image processing apparatus according to claim 2, wherein the hardware processor
   (1) upon the time schedule indicated by the schedule information satisfying the first condition but not satisfying the second condition, performs control in such a manner as to extend the buffer by a first capacity that allows the data transferer to perform the second process for time from the first timing to the second timing,
   (2) upon the time schedule indicated by the schedule information satisfying the second condition but not satisfying the first condition, performs control in such a manner as to extend the buffer by a second capacity that allows the data transferer to perform the second process for time from the third timing to the fourth timing, and
   (3) upon the time schedule indicated by the schedule information satisfying both of the first and second conditions, performs control in such a manner as to extend the buffer by the first or second capacity, whichever is larger.

5. The image processing apparatus according to claim 2, wherein the hardware processor performs control in such a mariner as to calculate a resolution number being a value obtained by dividing time from the third timing to the fourth timing by a difference between time required for the second process for one set of the image determination-purpose data and time required for the third process for one set of the image determination-purpose data, on the basis of a processing speed of the second process and a processing speed of the third process, complete the third process for the image determination-purpose data of up to an integral number exceeding the calculated resolution number for each set of raster data, and then release the extended area of the buffer.

6. The image processing apparatus according to claim 2, wherein upon having determined that the time schedule indicated by the schedule information satisfies the second condition, the hardware processor calculates a resolution number being a value obtained by dividing time from the third timing to the fourth timing by a difference between time required for the second process for one set of the image determination-purpose data and time required for the third process for one set of the image determination-purpose data on the basis of the schedule information, and increases a processing speed of the third process in such a manner that the calculated resolution number is equal to or less than the number of sets of the image determination-purpose data corresponding to the raster data.

7. The image processing apparatus according to claim 6, wherein the hardware processor
upon having changed the processing speed of the third process, regenerates the schedule information on the basis of the changed processing speed, and
determines the buffer's capacity to be extended, on the basis of the regenerated schedule information.

8. The image processing apparatus according to claim 1, wherein the hardware processor
upon the time schedule indicated by the schedule information having been determined to satisfy the overflow condition, performs control in such a manner as to increase a processing speed of the third process,
upon having changed the processing speed of the third process, regenerates the schedule information on the basis of the changed processing speed, and
upon a time schedule indicated by the regenerated schedule information having been determined to satisfy the overflow condition, performs control in such a manner as to extend the buffer.

9. The image processing apparatus according to claim 1, wherein upon the raster data output continuously outputting a plurality of sets of the raster data, the hardware processor performs control in such a manner as to extend the buffer.

10. The image processing apparatus according to claim 1, wherein the data transferer generates the image determination-purpose data by performing predetermined image processing on the divided data.

11. A method performed in an image processing apparatus, comprising:
executing a first process of outputting raster data obtained by developing print data;
generating image determination-purpose data on the basis of divided data obtained by dividing the raster data, and executing a second process of storing the generated image determination-purpose data in a buffer;
executing a third process of determining whether or not an image presented by the image determination-purpose data stored in the buffer contains a specific image;
generating schedule information indicating a time schedule of the first, second, and third processes, determining each set of raster data on whether or not the time schedule indicated by the schedule information satisfies an overflow condition; and
upon having determined that the time schedule satisfies the overflow condition, extending the buffer,
wherein the overflow condition is a condition that at least part of a period of the second process overlaps with at least part of a period during which the image determination-purpose data for which the third process has not been completed occupies an entire area of the buffer.

12. A non-transitory recording medium storing a computer readable program causing a computer of an image processing apparatus to execute an information processing method comprising:
executing a first process of outputting raster data obtained by developing print data;
generating image determination-purpose data on the basis of divided data obtained by dividing the raster data, and executing a second process of storing the generated image determination-purpose data in a buffer;
executing a third process of determining whether or not an image presented by the image determination-purpose data stored in the buffer contains a specific image;
generating schedule information indicating a time schedule of the first, second, and third processes,
determining each set of raster data on whether or not the time schedule indicated by the schedule information satisfies an overflow condition; and
upon having determined that the time schedule satisfies the overflow condition, extending the buffer,
wherein the overflow condition is a condition that at least part of a period of the second process overlaps with at least part of a period during which the image determination-purpose data for which the third process has not been completed occupies an entire area of the buffer.

* * * * *